INVENTOR
BERNARD A. MOSER

BY Henry Shur
ATTORNEY

INVENTOR
BERNARD A. MOSER

BY Henry Shur
ATTORNEY

INVENTOR
BERNARD A. MOSER
BY Henry Shur
ATTORNEY

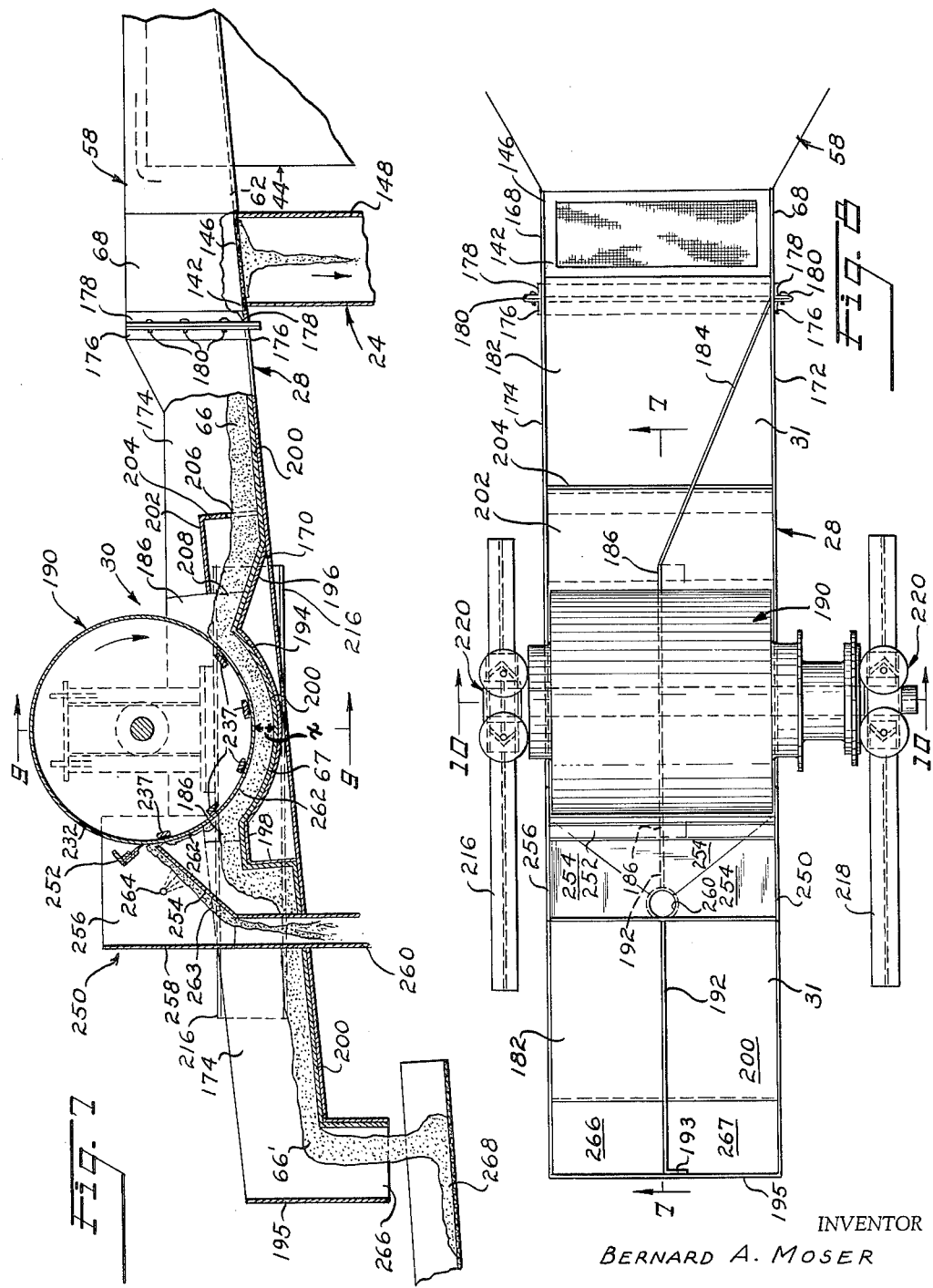

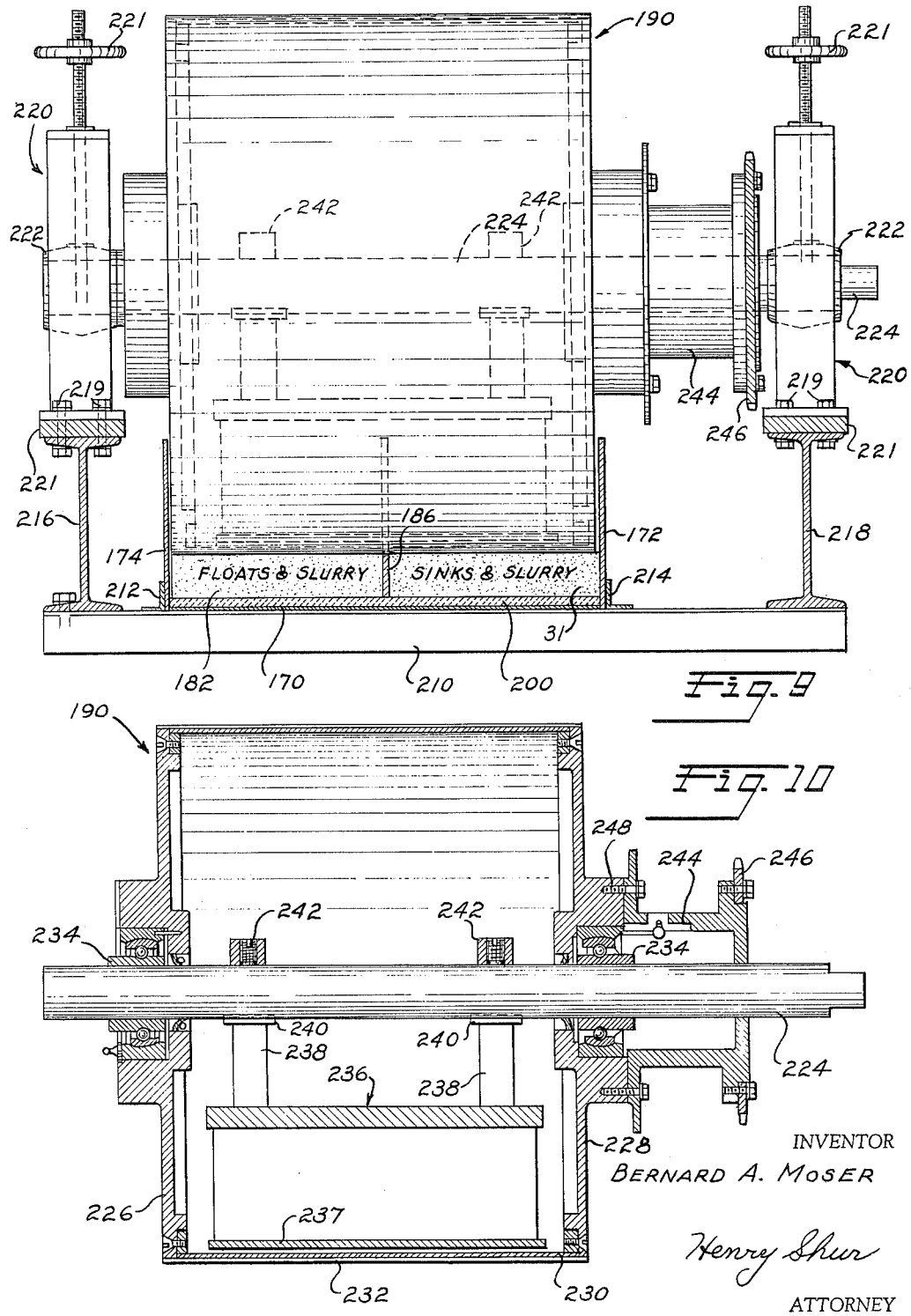

INVENTOR
BERNARD A. MOSER

Henry Shur
ATTORNEY

INVENTOR
BERNARD A. MOSER

Henry Shur
ATTORNEY

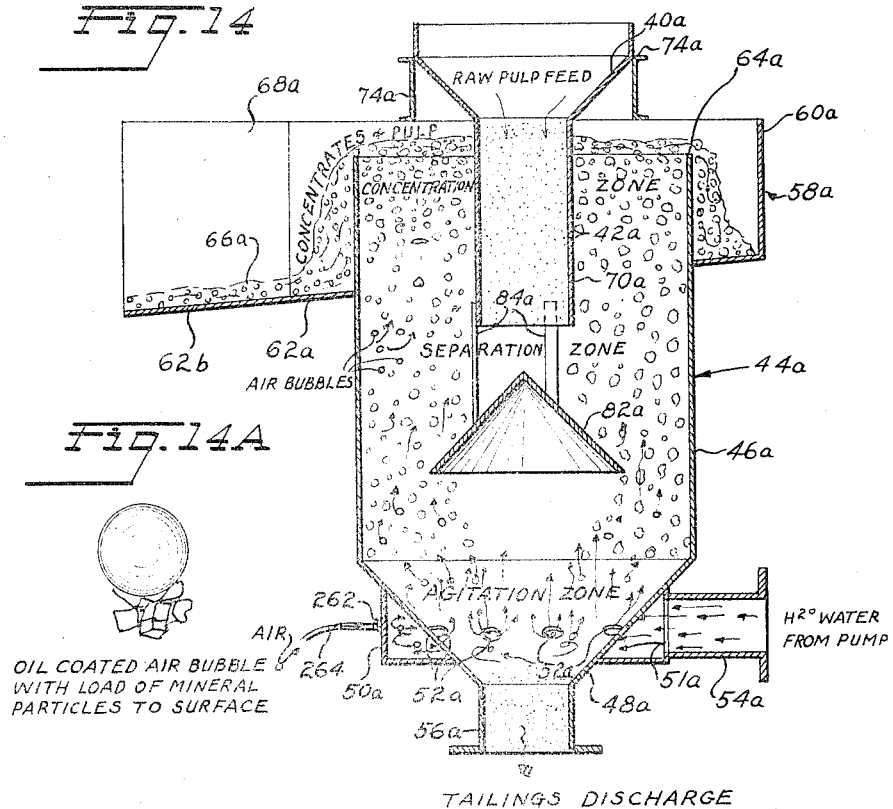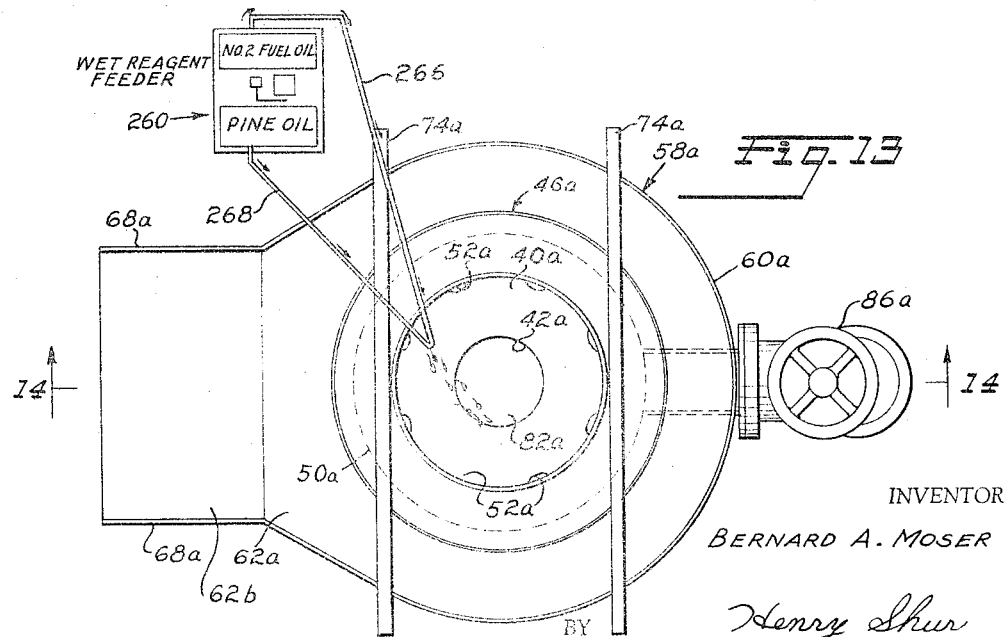

__United States Patent Office__

3,246,749
Patented Apr. 19, 1966

3,246,749
METHOD AND APPARATUS FOR SINK AND FLOAT SEPARATION FOR MINERALS OF SMALL PARTICLE SIZE
Bernard A. Moser, Pottsville, Pa., assignor to Capital Coal Company, Inc., Pottsville, Pa., a corporation of Pennsylvania
Filed Oct. 18, 1960, Ser. No. 63,432
20 Claims. (Cl. 209—12)

The present invention relates to a new improved apparatus for achieving sink and float separation of minerals of small particle size having different density characteristics.

More especially, this invention relates to a new improved continuous operating hydraulic apparatus for separating desired lighter particles like coal from heavier noncombustible impurities, like slate, in the raw feed ore, using a dense media having a specific gravity intermediate that of the desired coal and the undesired impurities, whereby the coal particles are floated and recovered while the undesired impurities sink and are disposed of as waste. This invention also especially relates to such a new improved hydraulic separatory apparatus which preferably employs a magnetic suspension or slurry as the dense media, and also incorporates a new improved magnetic separator to which the floats containing the fine coal particles (and, if desired, the sinks) are directly transmitted from the dense media separatory system, for there reclaiming the magnetite used as the dense media. Further, another aspect of the present invention relates to froth floatation for separating lighter particles of coal from the undesired non-combustible sinks, by means of a modification of my new improved separatory apparatus used for carrying out the dense media separation process referred to above.

As is known to those in the art, coal as it is taken from a deep mine or a strip mine, and the breaker spill bank refuse at a mine, commonly contains small sized coal with various amounts of non-combustible material, called slate or rock. For many years, small sized coal was merely discarded at mining operations, since it had no substantial market and could not be economically reclaimed for that market which existed. However, during the past twenty-five years or so, a substantial demand has developed for small sized coal, principally for use in large steam and power plants (which usage is extending as hydraulic power sites become scarcer and production of hydraulic power becomes costlier) and in automatic home and building heating equipment developed during this period.

As a result of this developing market, there has been considerable interest and development work, for over twenty-five years, on various apparatuses and methods for economically recovering small sized coal of low ash content from raw material which usually has a substantial waste content, varying, for example, from 20% to 25% for deep mine coal refuse, up to 40% to 60% for spill bank tailings from coal breakers. Considerable effort has been directed to developing apparatuses and methods for the so-called "sink and float" separation of mixtures of solid particles, usually by taking advantage of the different settling rates of the desired coal particles (called "floats"), which have a lighter specific gravity than the undesired slate and rock impurities (called "sinks"). In one of the most common type of sink and float separation process, the raw feed mixture of lighter coal particles and heavier slate and rock particles is immersed in a "dense media" slurry which has a specific gravity greater than that of the coal particles and less than that of the undesired slate and rock. The mixture is thus separated into its components by the tendency of the more dense waste materials to sink through the dense media while the less dense coal particles float upward on the dense media to a point of discharge. The dense media usually consists of finely ground solids, such as sand or magnetite, suspended in water, with the particles preferably being of colloidal or semi-colloidal size (e.g., 30 mesh to 350 mesh), so that the dense media used in the float and sink separatory process in a somewhat stable slurry.

Illustrative examples of numerous dense media separatory apparatuses and methods developed over the years are shown in Chance Patent No. 1,545,636, issued July 14, 1925; M. A. Walker Patent No. 2,220,925, issued November 12, 1940; J. J. Bean Patent No. 2,474,774, issued June 28, 1949, and M. L. Davis Patent No. 2,877,-897, issued March 17, 1959.

The processing of low grade ores, and especially the recovery of saleable small sized coal from mining wastes is a very competitive business. In order that a process and apparatus for recovering such fine coal from mine waste may gain wide spread acceptance, it is necessary that they be well adapted to relatively large scale, and preferably continuous, operation, at low total cost per unit of production of the desired product, by virtue of efficient separation of the desired coal from the mining waste raw material (or other ore, in the case of comparable recovery of some other desired mineral). For recovery of fine coal, the process must be so efficient that it can economically produce such coal with a low ash content, which generally must be held to less than 13% for a good saleable product. Considering that the coal mine waste used as raw material contains 20% to 60% non-combustible refuse, meeting the ash tolerance is a substantial practical problem.

Dense media apparatuses and methods heretofore available have had a number of serious limitations. Prior dense media systems have not generally been used for recovery of barley or other coal smaller than rice ($\frac{3}{16}$ size) due to excessive ash content in the recovered coal, and due also to excessive loss of magnetite when that material is used for the dense media slurry. Such magnetite, which is preferred for dense media slurry because it can be magnetically reclaimed from the coal product, presently costs about $1.75 per hundred pounds. In dense media systems heretofore available, up to one pound of magnetite per ton of clean coal cannot be reclaimed when processing fine coal such as barley size or smaller; as a result, the ash content of the coal product is increased beyond permissible tolerances, and the unit cost per ton of coal is also increased.

As a result of these and other limitations of presently available dense media separatory apparatuses and methods, the coal mine refuse reclaiming industry has adopted various alternative systems for reclaiming fine coal, especially barley and smaller sizes. For example, many in the industry are currently using a hydraulic system which does not utilize dense media to reclaim barley and smaller sized coal from various kinds of mining waste. However, the best of such hydraulic systems can effectively process only one size coal; for example, barley or No. 4 or No. 5. When processing a raw feed mixture including barley, No. 4 and No. 5 sizes, if such hydraulic apparatus efficiently clears the barley ($\frac{3}{32}$ of an inch), it will lose too much of the No. 4 ($\frac{3}{64}$ of an inch) and virtually all of the No. 5 ($-\frac{3}{64}$ to 30 mesh). On the other hand, if such hydraulic apparatus is set to efficiently clear No. 4 coal, it will not clear the larger barley because the latter is too heavy. Another alternative system which many in the industry have adopted utilizes a plurality of vibrating tables with water spray to achieve flotation separation of the fine coal particles from the non-combustible portion of the mining waste raw material. These tables, however, have small capacity and can separate only one size coal. Thus, the system has serious shortcomings for large scale operation. Further, these representative systems, which have been adopted in lieu of dense media separatory systems heretofore available, are generally much more costly to install, are virtually inflexible for cleaning various sized coal, require substantial manpower and horsepower per ton per hour of raw material processed and coal recovered, and are relatively complicated wherefore they require substantial maintenance and usually incur substantial "down time." Yet, notwithstanding such disadvantages, these alternative systems have been adopted in many instances in lieu of a dense media separatory system because of the shortcomings of dense media systems heretofore available.

Another significant shortcoming of dense media separatory systems heretofore available which has limited their competitive position in the coal reclaiming industry is that they have not only been unable to efficiently clean fine coal sizes, but they cannot simultaneously effectively clean more than one size fine coal, barley or smaller, with the requisite degree of efficiency. Hence, with heavy media systems heretofore proposed for this purpose, if it is desired to separate more than one size coal from the mining waste (for example, barley, No. 4, and No. 5), the raw material must first be separated into the different sizes desired by suitable means such as a Parrish shaker system, and each batch of differently sized raw material processed in an individual dense media separatory system. Even then, presently available dense media systems have not been satisfactory for cleaning fine coal sizes separately.

Still another shortcoming of previous dense media separatory systems which has burdened their competitive position is that it has been necessary to pass the floats, which include the desired coal particles plus the dense media slurry, to a shaker screen with a clean water spray to wash the dense media from the coal. Thereafter, when magnetite is used, this dense media washed from the coal is passed with the spray water and the water in the dense media slurry to a magnetic separator device to recover the magnetite in view of its cost. When magnetite is used for the dense media slurry, the sinks are similarly processed by the same shaker which is suitably partitioned for that purpose, or by another shaker, and the magnetite thereafter similarly recovered. The aforementioned shaker screen (or screens) for removing the dense media particles from the coal to reduce their ash content (and to recover magnetite media from the sinks) costs about $12,000.00 to $15,000.00 for 60 tons per hour raw material processing installation. Also, the operation of this screen requires a 10 horsepower motor and substantial power input. Further, the shaker screens must be replaced rather frequently, usually about every sixty days at a 60 tons per hour rate of operation, at a cost of about $1,000.00. As will be appreciated, this requirement of a shaker has put previous dense media separatory systems to a substantial competitive disadvantage vis-a-vis available alternative systems such as discussed above, with respect to cost of operation per unit product, and cost of initial installation and maintenance, both of which must be borne by the unit product.

It is a principal purpose of the present invention to provide new improved dense media separatory apparatus for efficiently separating fine coal from heavier non-combustible impurities in mining waste raw materials which eliminates the shortcomings of, and overcomes the disadvantages of, dense media separatory systems heretofore available, and which is superior to, and less costly than, alternative fine coal recovery systems presently available, such as those discussed above.

It is an object of the present invention to provide a new improved completely hydraulic continuously operable, float and sink separatory apparatus for separating fine coal from non-combustible waste (or desired fine minerals from ore) using a dense media, and more especially magnetite.

It is another object of this invention to provide such a dense media separatory system incorporating a novel settlement compartment and weir arrangement for recovering some of the media from the floats and removing excess water therefrom to increase its specific gravity, whereby the resultant dense media slurry can be returned to the main dense media supply of the separatory system for continued use. It is a related object of the present invention to provide a dense media separatory system with such a settlement and recovery compartment which includes valve means for controlling the specific gravity of the dense media slurry recovered therein and returned to the main dense media supply of the system. It is another related object to thereby reduce the load on the apparatus used for reclaiming dense media from the float product of the system (and from the sinks, when magnetite media is used and reclaimed therefrom).

It is still another object of the present invention to provide a new improved completely hydraulic dense media separatory system utilizing a siphon sink removal arrangement which incorporates a valve controlled booster that provides an aspirator effect for control of the sinks discharge rate and to prevent blocking of the sinks discharge siphon manifold. It is a related object of this invention to provide a siphon arrangement including a valve control at the siphon discharge outlet for additional control of rock and slate discharge as desired.

It is still further an object of the present invention to provide a dense media separatory system which not only can efficiently clear coal of smaller size than rice (which is the smallest size generally processed in present dense media systems), but can also simultaneously efficiently clear three sizes of fine coal, such as barley, No. 4 and No. 5, in the same apparatus. It is a related object of this invention to provide such an improved dense media separatory system which can efficiently clean such fine coals from mine waste so that the ash content is within the tolerances for good saleable coal.

It is yet another object of the present invention to provide a system for separating fine coal (or like minerals) from waste by means of a magnetic dense media, such as magnetite, which is so efficient that the floats and sinks and residual magnetic slurry thereon may be passed directly to a magnetic separator apparatus for reclaiming of the magnetite therefrom, thus eliminating the intermediate costly shaker means which is used in dense media systems heretofore available between the separatory vessel discharge and the magetite reclaiming apparatus.

It is a related object of the present invention to provide a magnetic dense media separatory system in which a much larger ratio of magnetite can be recovered than is possible with systems heretofore available, and more especially wherein the magnetite loss in the system of my invention is about 25% of the typical magnetite loss in prior dense media systems for comparable operations.

It is another object of the present invention to provide such a new improved all-hydraulic dense media separatory system which has only two moving components (motor and pump), whereby maintenance problems and costs are reduced to a minimum, and manpower and electric power requirements and costs thereof are also reduced to a minimum on a per ton per hour basis. It is a related object of the present invention to provide such a dense media separatory system having a new improved main vessel construction which incorporates a novel stationary feed well and distributor arrangement for feeding of the raw material without bunching and also incorporates a circulating jet feed arrangement for the dense media slurry, whereby the particles of coal mine waste and dense media fed into the vessel are effectively dispersed throughout it, with a relatively constant necessary specific gravity at the desired region of the vessel for effective separation of the floats from the sinks. It is a related object of this invention to thereby eliminate the power operated agitating means typically incorporated in comparable float and sink dense media separatory systems for this purpose.

It is another object of the present invention to provide a new improved magnetic drum type magnetite recovery apparatus which includes a chute of circular cross section (vertically) adjacent the magnetic drum, thereby making it possible to feed larger quantities of material (floats and/or sinks) for extraction of the magnetite therefrom, with more efficient usage of the magnetic field of the magnets in the recovery drum, than in comparable prior devices of this kind.

It is still another object of the present invention to provide a new improved drum type magnetic dense media recovery apparatus incorporating means for adjusting the cross sectional area of the passage between the drum and the adjacent portion of the chute, and thus adjusting the mean distance between the recovery magnet and the particles of magnetite in the floats and/or sinks being processed, thereby achieving more efficient reclaiming of the magnetite when varying volumes of material are passed through the separator apparatus, especially in processing low volumes.

It is a still further object of the present invention to provide such a new improved drum type magnetic dense media recovery apparatus which incorporates a partitioned chute arrangement so that the magnetic media can be simultaneously recovered from both the coal floats and the waste sinks by means of the same chute and magnetic drum.

It is another object of the present invention to provide a modification of the separatory apparatus used for the dense media process discussed above to carry out a froth flotation separatory process for the separation of coal or fine ore particles of minus 20 mesh to 60 mesh, which are too small to efficiently separate with a dense media system. It is a related object of the present invention to provide such a froth flotation separatory apparatus and method which efficiently separates such fine ore particles, as in No. 6 coal, by a combined action in the separatory vessel of agitation and aeration in the agitator zone, with absence of swirling in the separation zone, and with quick removal of the mineral laden froth from the concentration zone over the top of the main separatory vessel, the entire circumference of which serves as a weir.

Other objects and advantages of the present inventions will be apparent from the following description thereof with reference to the accompanying drawings, wherein.

Figure 11:
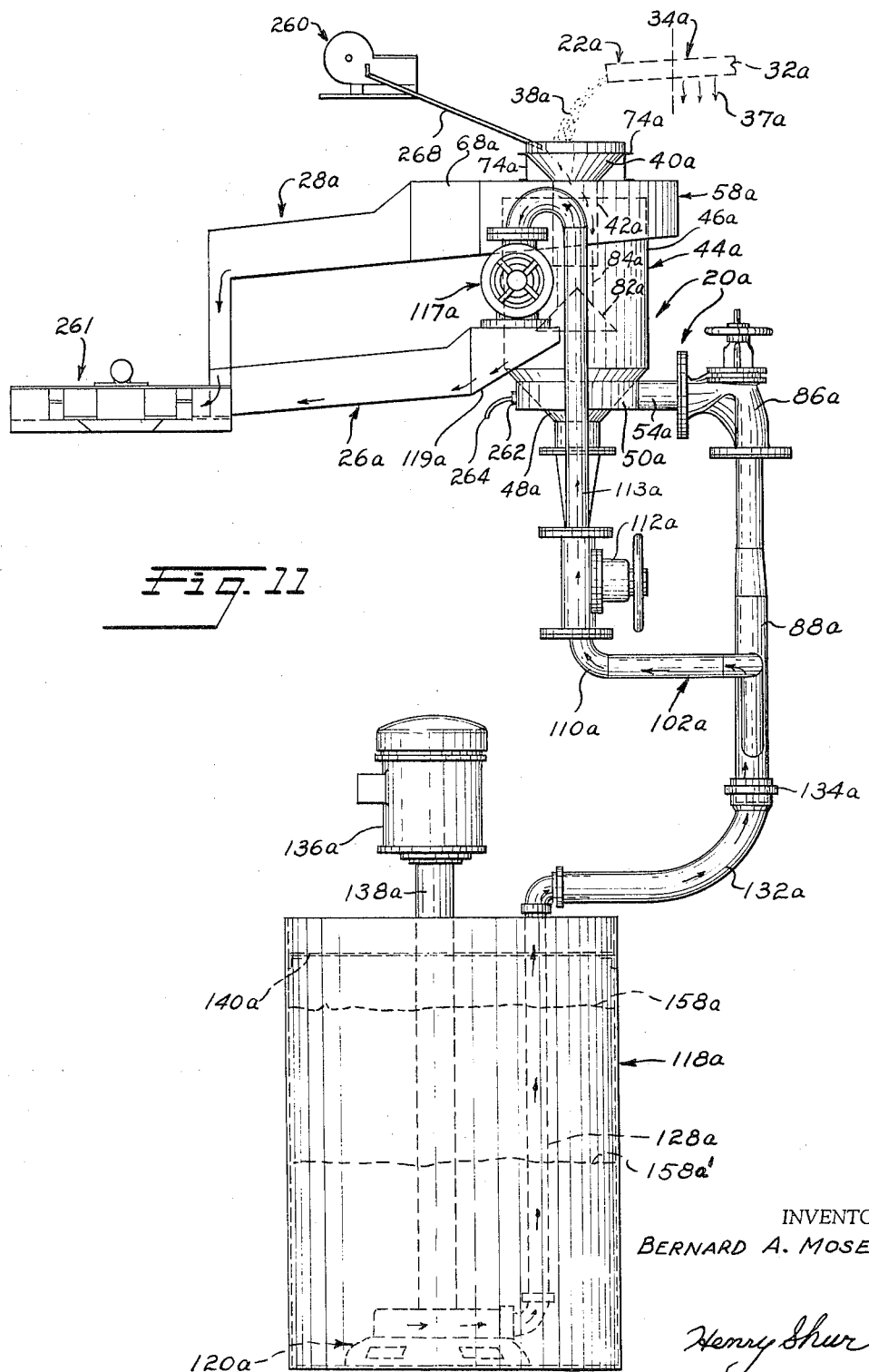
Figure 12:
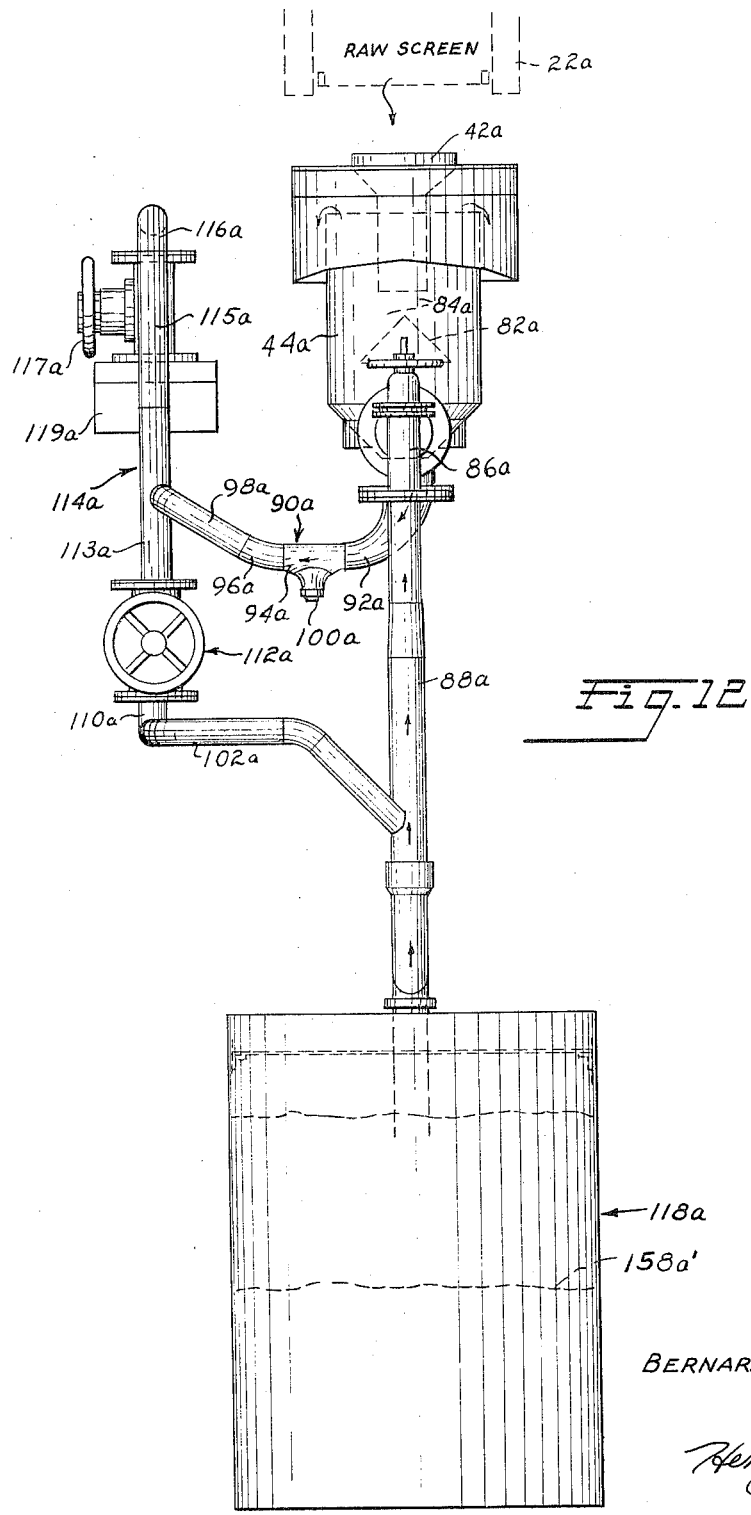

FIGURE 7 is a side elevation and partly cross-sectional view (taken along line 7—7 in FIGURE 8) of the new improved magnetic media recovery apparatus of this invention in which the magnetic drum is adjustable with respect to the chute for more efficient reclaiming of the magnetite used in the dense media slurry for the floats and sinks process carried out with the separatory apparatus of FIGURES 1–6;

FIGURE 8 is a top plan view of the new improved adjustable magnetic drum magnetic media reclaiming apparatus shown in FIGURE 7, incorporating a partitioned chute arrangement whereby magnetic media used in the floats and sinks separatory process can be simultaneously reclaimed from both the coal floats and waste sinks, which are discharged to the reclaiming apparatus directly from the separatory apparatus of FIGURES 1–6;

FIGURE 9 is an end elevation and partial cross-sectional view (along line 9—9 in FIGURE 7) showing means for adjusting the position of the magnetic recovery drum with respect to the underlying circular cross-section chute portion of the magnetite reclaiming apparatus of FIGURES 7–8;

FIGURE 10 is a vertical cross-sectional view, taken along line 10—10 in FIGURE 8, showing details of the magnetic drum for recovering the magnetite media from the coal and/or sinks discharged from the separatory system of FIGURES 1–6;

FIGURE 11 is a side elevation view of a modified form of separatory vessel and circuit for an improved process of separating very fine coal particles from non-combustible refuse in the raw feed by means of froth flotation (rather than by use of dense media);

FIGURE 12 is an end elevation of my new improved froth flotation separatory vessel and circuit shown in FIGURE 11 (looking to the left in FIGURE 11);

FIGURE 13 is a top plan view of the main separatory vessel of my new improved froth flotation separatory apparatus shown in FIGURES 11 and 12;

FIGURE 14 is a vertical cross-section view, taken along line 14—14 in FIGURE 13, showing the main separatory vessel and illustrating the froth flotation separation process carried out in the system shown in FIGURES 11–13; and FIGURE 14A is an enlarged schematic illustration of an oil coated bubble of air bearing a load of very fine coal particles, which will thereby be lifted to the weir top of the main vessel for separation from the non-combustible tailings which sink to, and are discharged from, the bottom of the vessel.

Before particularly describing the present invention, it is noted that supporting frame structure for the various components of the dense media separatory system of FIGURES 1–10 and of the froth flotation separatory system of FIGURES 11–14 are not shown, so as to not unduly burden the drawings and application with description thereof, since any suitable supporting structure for the over-all separatory system may be used, and such structures will be apparent to those skilled in the art in the light of the disclosure herein.

Figure 1:
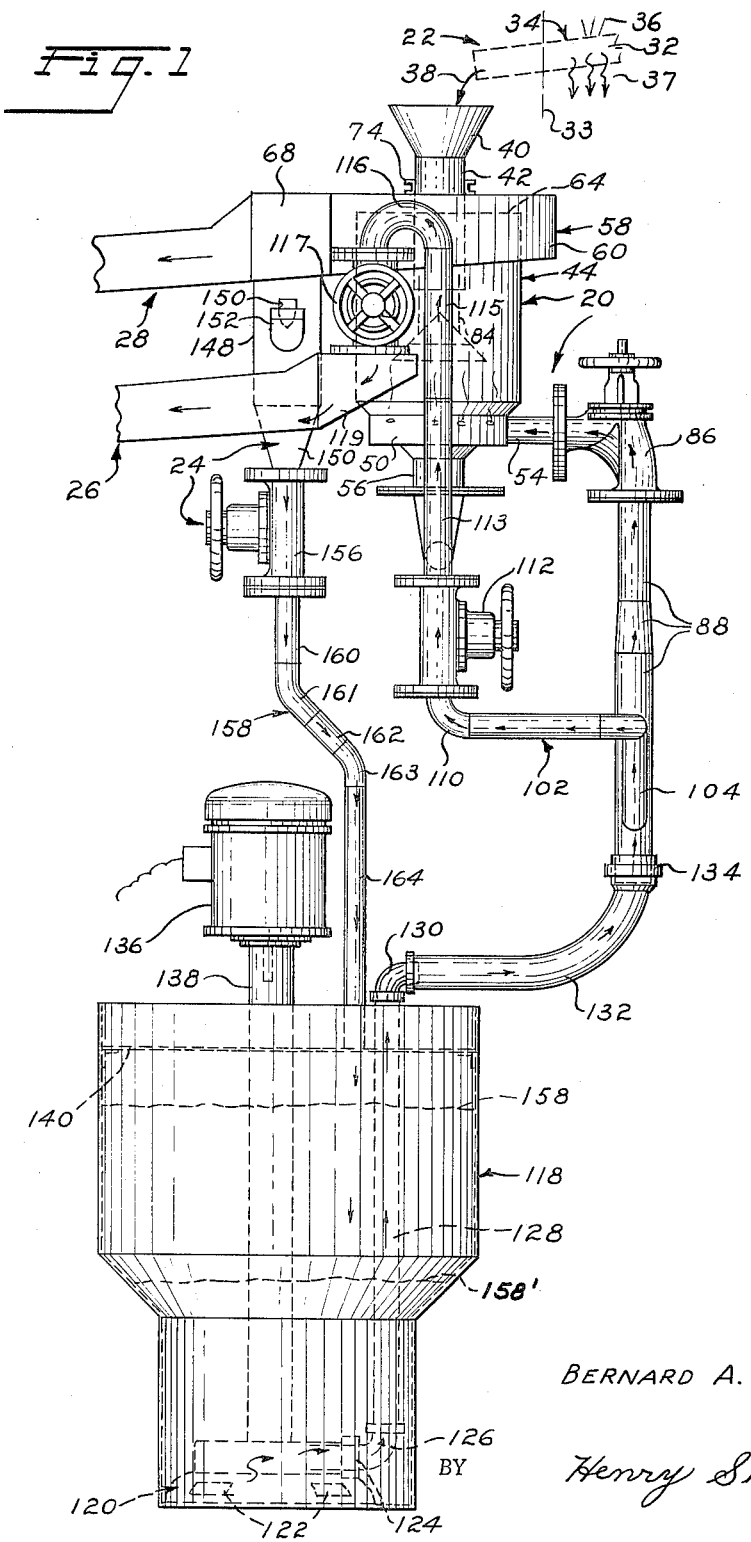
FIGURE 1 is a side elevation view of the new improved, completely hydraulic apparatus for separating lighter coal particles from the non-combustible refuse in the raw feed, showing the dense media separatory vessel and circuit and settling compartment arrangement for recovering some of the dense media prior to recovery of the media from the coal (and sinks) discharged from the system.

Referring to FIGURES 1–8, and especially to FIGURES 1 and 7, the preferred over-all new improved dense media system for separating fine coal solids from non-combustible waste, according to the present invention, comprises: my new improved dense media separatory vessel with hydraulic circuits, generally indicated by the numeral 20; a conventional means indicated at 22 for feeding raw material to the separatory vessel 20; a settlement and weir compartment for recovering dense media from the floats and associated hydraulic circuit generally indicated at 24; a spill box and discharge chute indicated at 26 for disposing of rock and slate sinks plus slurry discharged from the dense media separatory system 20 after separation from the desired coal; and a chute 28 for conveying the floats (coal particles plus slurry) to my new improved adjustable position magnetic drum dense media reclaiming apparatus 30. In the preferred embodiment, reclaiming apparatus 30 has dual channels (FIGURE 8) for simultaneously recovering the magnetite of the dense media slurry from both the floats and the sinks, in which case, the extension of chute 26 also discharges the sinks to input section 31 of the magnetic drum separatory apparatus 30.

Figure 2:
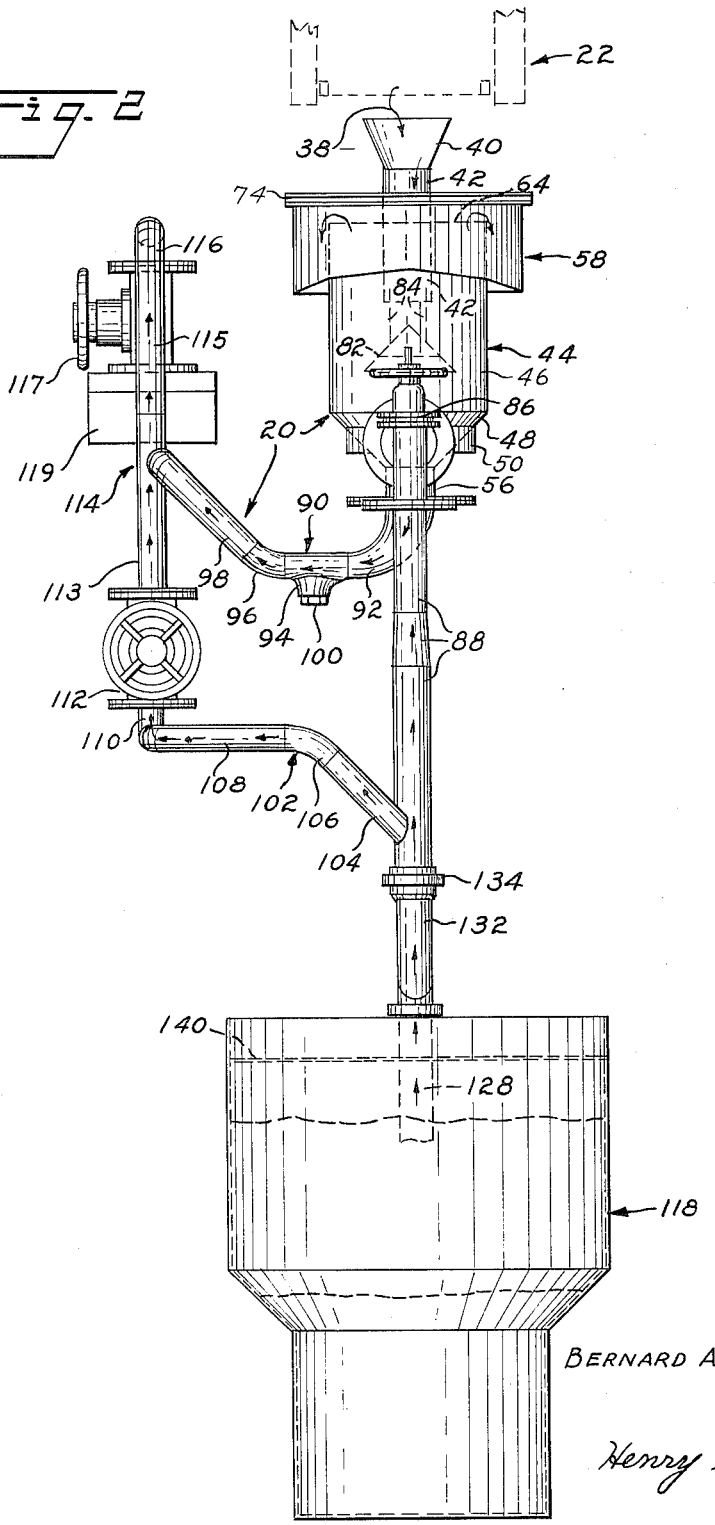
FIGURE 2 is an end elevation of the new improved dense media separatory system shown in FIGURE 1 (looking to the left in FIGURE 1)

Referring particularly to FIGURES 1 and 2, the raw feed input means 22 may be of any suitable type, and more specifically may be a Parrish type raw feed shaker, which is well known in this art and therefore need be only schematically represented and generally described in this application. Such a Parrish shaker includes one or more perforated decks in communication with the shaker input, and these are generally indicated at 32, to the right of the vertical line 33, in the schematic illustration of FIGURE 1. Since the new improved dense media separatory system of the present invention is capable of separating three sizes of coal from the non-combustible waste in the raw material (e.g., "barley" which is ⅜₂ in size, "No. 4" which is ⅜₄ in size, and "No. 5" which is —⅜₄ to 30 mesh in size) the Parrish type raw feed shaker 22 comprises three perforated decks which will pass these three different sizes of coal. The raw material, which usually comprises 20% to 60% refuse depending on its source, is fed into the input 32 of the Parrish shaker 22, as indicated schematically by arrow 34 in FIGURE 1. This raw material input is sprayed with water under pressure as indicated schematically at 36, to wash out —30 mesh particles of waste, generally indicated at 37, which primarily is rock and slate and has such high ash content that it is not usable; this —30 mesh waste is disposed of in any suitable conventional manner.

Particles of greater than 30 mesh in size pass from the output of the Parrish shaker 22, as schematically indicated at 38, to the sloping-sided feed chute 40 and thence through a feed well 42 into the main separatory vessel 44 of the dense media separation system 20. The feed chute 40 may be of any suitable material, such as wood or steel, which can satisfactorily withstand the abrasive action of the material 38 fed from the output of the Parrish shaker 22, and it is not shown or described in detail since it does not per se form a part of the present invention. It is noted that the material 38 fed from the output of the Parrish shaker 22 to feed chute 40 and separatory vessel 44 comprises particles of coal and non-combustible material of sizes between 30 mesh and ⅜₂ of an inch, plus about 15% to 20% moisture content as a result of water spray 36. This moisture content of the raw material input to separatory system 20 affects the specific gravity of the dense media slurry in the separatory system, and must be taken into account in operation of the system.

Figure 3:
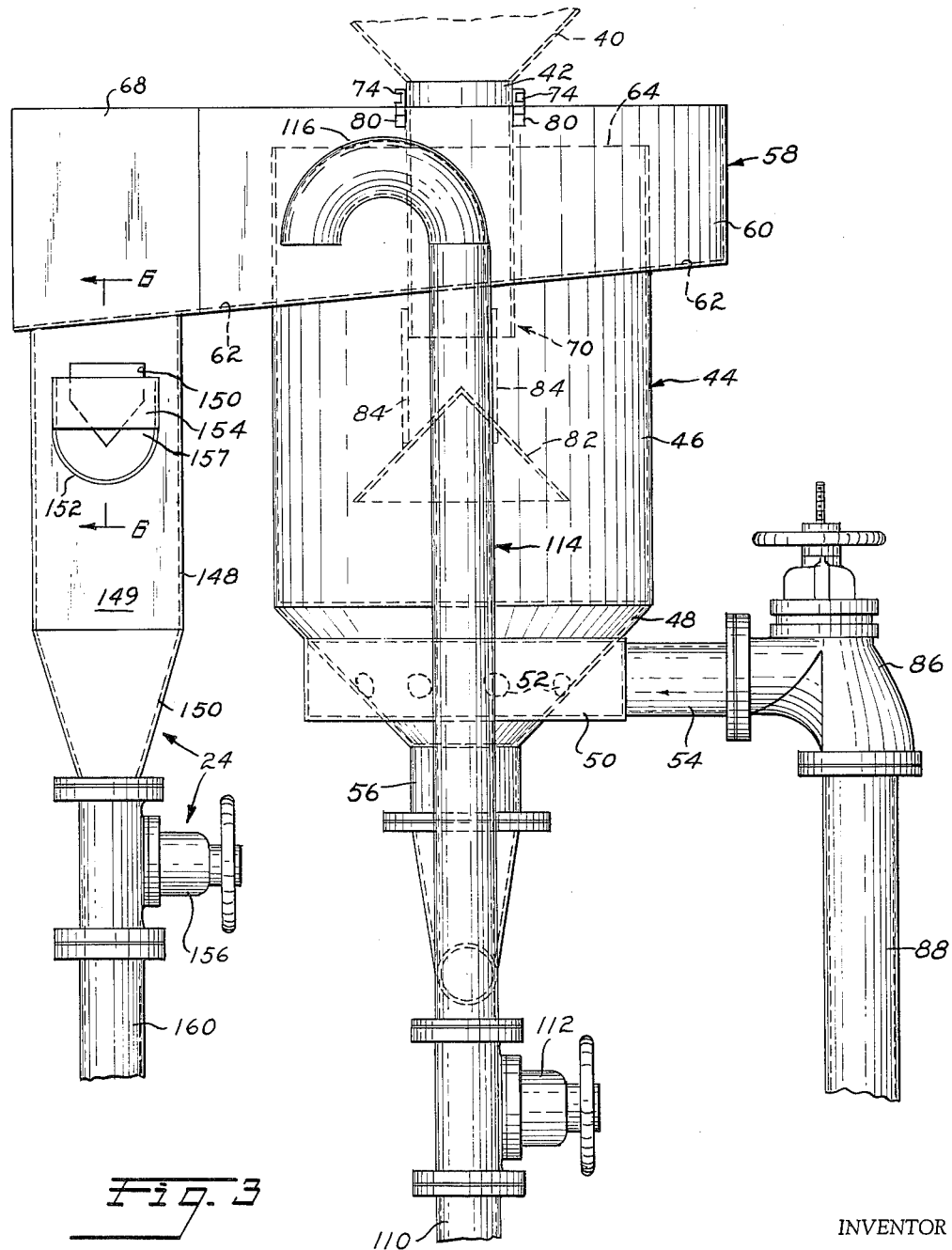
FIGURE 3 is an enlarged side elevation view of part of the new improved dense media separatory system shown in FIGURE 1, especially showing the raw material feed and distributor means, the main separatory vessel, the coal floats over-flow launder, the sinks siphon manifold, the dense media settlement and recovery compartment, and part of the related hydraulic circuits.
Figure 4:
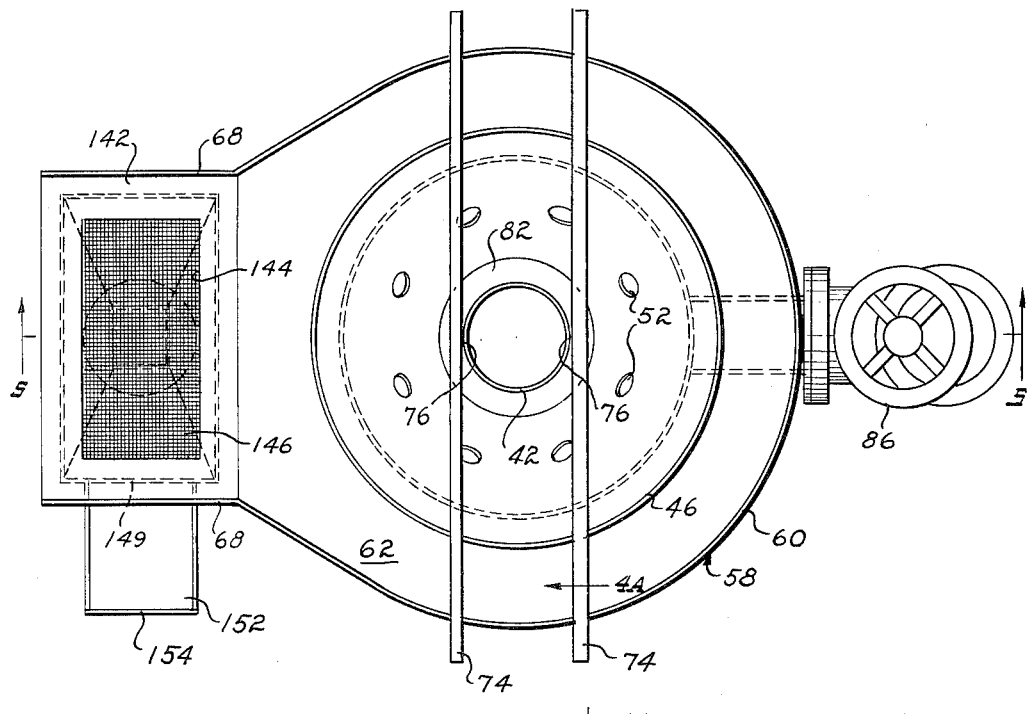
FIGURE 4 is a top plan view of part of the new improved dense media separatory system shown in FIGURE 3 (with feed well and siphon omitted), especially showing the main separatory vessel and the dense media settling compartment (which is topped by a wire cloth)
Figure 5:
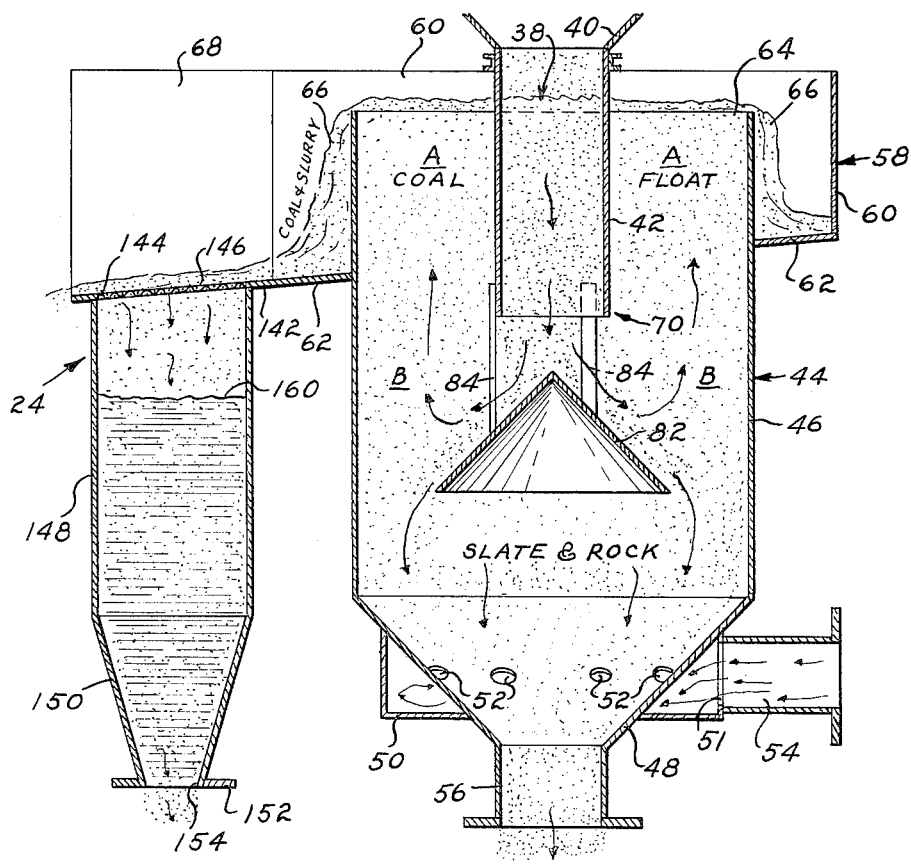
FIGURE 5 is a vertical sectional view taken along line 5—5 in FIGURE 4, showing especially the main separatory vessel and dense media settling and recovery compartment, and schematically illustrating the dense media separatory process carried out with the new improved apparatus of the present invention.

Referring especially to FIGURES 1–5, and more especially to FIGURES 3, 4 and 5, the main separatory vessel 44 comprises a relatively large upright cylindrical tank 46, which has at its lower end a conical slate and rock bottom compartment 48 that is surrounded by an annular dense media circulating compartment 50, from which there laterally extends a dense media slurry input conduit 54 that communicates with compartment 50 through aperture 51. Circulating compartment 50 is in fluid communication with separatory vessel 44 by reason of a plurality of apertures 52 extending through the slanted wall which forms the conical slate and rock cone compartment 48, the latter preferably being at a 45° angle to the vertical. Uniform circumferential spacing of inlet holes 52 is preferable, and in the disclosed embodiment, eight inlet holes 52 are utilized. A cylindrical slate and rock discharge section 56 extends vertically from the lower end of the conical compartment 48.

The separatory vessel 44 is surrounded at its upper end by an over-flow launder, generally indicated by the numeral 58. As will be apparent from FIGURES 3, 4 and 5, in particular, the over-flow launder 58 comprises an upright wall 60, which is spaced from, and extends around, the upper portion of the main separatory vessel cylinder 46, and a sloping bottom plate 62 which interconnects the lower edge of upright wall 60 and the exterior of the cylindrical main vessel section 46. The upright launder wall 60 extends a suitable distance above the upper periphery 64 of the main separatory vessel 44, so that the coal and slurry floats indicated at 66 will pass over the vessel's circumferential periphery 64, all of which serves as an oversize weir, into the launder 58 and then along its sloping floor 62 and over the upper end of the dense media settlement and recovery compartment 24 between the upright side walls 68 which extend from the ends of launder upright wall 60.

Figure 4A:
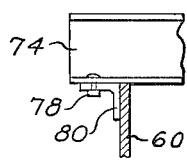
FIGURE 4A is a fragmentary vertical sectional view along line 4A—4A in FIGURE 4 showing suitable means for removably mounting the feed well and distributor means on the main separatory vessel of the system.

Still referring especially to FIGURES 3, 4 and 5, the separatory vessel 44 is provided with a raw feed well and distributor arrangement, generally indicated at 70, which comprises cylindrical vertically and concentrically disposed feed well 42 welded or otherwise secured at diametrically disposed portions 76 to the webs of a pair of parallel channel irons 74 which are removably secured to the upper periphery of upright launder wall 60. An inverted conical distributor 82 is secured in alignment with, and spaced from, the lower end of feed well 42 by suitable means, such as three bars or straps 84 which are secured at their opposite ends to feed well 42 and the conical distributor 82 by welding or the like. The cross members 74 are removably secured at each end to launder upright wall 60 in any suitable manner, as by bolts 78 extending through the lower side of channels 74 and angle iron lugs 80 which are welded or bolted to the sides of launder upright wall 60, as shown in FIGURES 3, and 4A. Thus, the entire feed well and distributor arrangement 70 is readily removable for replacement whenever desired.

The conical distributor 82 may also be adjustably mounted so that it can be raised or lowered with respect to the end of feed well 42, to allow greater volume of raw feed (38) or to quiet the action of the slurry in the separatory vessel 44. For this purpose, the upper ends of rods 84 can be secured to the exterior of feed well 42, or to cross members 74, so as to be vertically adjustable, in any suitable manner; e.g., by threading the upper ends of bars 84 and mounting them in threaded adjusting means on the cross members 74.

Referring especially to FIGURES 1–3, the hydraulic circuit for the dense media slurry of magnetite and water used in the separatory system 20 will now be more fully described. The open end of the input conduit 54 which extends laterally from the annular dense media circulating compartment 50 is connected to the output end of a suitable valve 86, whose input end is connected to a main slurry manifold conduit 88. The outlet section 56 below the bottom cone portion 48 of main separatory vessel 44 is connected to a slate and rock siphon manifold 90, which may comprise several connected sections 92, 94, 96 and 98, as shown especially in FIGURE 2. The intermediate and lowermost section 94 is provided with a removable threaded drain plug 100 so that the sinks siphon manifold 90 can be cleaned in the event it is blocked by slate and rock passing through it from the bottom cone portion 48 of main separatory vessel 44. A secondary dense media slurry manifold 102 comprising several connected sections 104, 106, 108 and 110 extends laterally from the lower portion of the main manifold 88, with section 110 being connected to the input of a valve 112 which serves as a siphon booster control, as hereinafter amplified. The outlet of the siphon control booster valve 112 is in turn connected to a plurality of conduits 113, 115 and 116 that form a sinks removal siphon generally indicated at 114. It will be noted that the end section 98 of the sinks siphon manifold 90 is connected to intermediate section 113 of siphon 114. Thus, material may flow into the siphon 114 from both the bottom cone 48 of main separatory vessel 44 through manifold 90, and from the secondary slurry manifold 102 through the booster control valve 112. The U-shaped upper end 116 of siphon 114 is disposed approximately at the same height as the weir top 64 of main separatory vessel 44. If desired, the outlet end of siphon section 116 is connected to the inlet of a control valve 117 having its outlet disposed above the spill box 119 of the sinks discharge chute 26, for control of the rate of rock and slate discharge from the siphon into the spill box 119, which serves to reduce the velocity of the siphon sinks discharge, thus reducing their flow in the sink discharge chute 26 to a suitable rate.

Referring especially to FIGURES 1 and 2, a main sump 118 of suitable size and shape is provided for storage of the dense media slurry used in separatory system 20. A suitable centrifugal pump 120 is provided in the bottom of the main storage sump 118 for propelling the dense media slurry through the separatory system 20. Pump 120 has one or more intakes 122, and an outlet 124 which is connected by means of an elbow 126 to a vertical pump discharge pipe 128, whose upper end extends slightly above the top of the heavy media storage sump 118. The upper end of the pump discharge pipe 128 is connected by suitable means, such as an elbow 130 and a flexible rubber hose 132, to the lower end of the main slurry manifold 88, with the upper end of the hose 132 being secured thereto by suitable means, such as a clamp 134.

The dense media slurry pump 120 is driven by any suitable commercially available motor 136, whose drive shaft is connected to the drive shaft of centrifugal pump 120 by means of an elongated drive shaft 138 which extends vertically through the main slurry storage sump 118. A mesh screen 140 of suitable size (e.g., ¾ inch square) extends across the main storage sump 118 near its open upper end, to prevent foreign objects from entering the sump; the screen is provided, of course, with suitable apertures for the drive shaft 138 and discharge pipe 128.

Referring to FIGURES 1, 3, 4 and 5, the dense media settlement and recovery compartment and its associated circuit, which are indicated by numeral 24, will now be more fully described. Referring particularly to FIGURES 4 and 5, at the open end of the launder 58, the bottom plate 62 is provided with a rectangular-shaped extension 142 having a central rectangular opening 144, across which there extends stainless steel wedge bar (or cloth) 146 of suitable size (24 mesh in the discussed embodiment). An elongated rectangular dense media settlement and weir compartment 148 extends vertically from the lower side of plate 142, and surrounds the rectangular aperture 144 therein. The lower end of compartment 148 is provided with a pyramidal-shaped reducing portion 150, having an end flange 152 of circular outline surrounding its rectangular open end 154. A control valve 156 is secured to flange 152 so that the lower end of settlement compartment 148 communicates through valve 156 with dense media return conduit 158, which may be made up of suitable piping sections, such as 160, 161, 162, 163 and 164, with the lower end of the return conduit 158 terminating just above the screen 140 in the main dense media storage sump 118.

Control valves 86, 112, 117 and 156 are preferably of the so-called diaphragm valve type (such as are commercially available from the Grinell-Saunders Company and other), because such diaphragm valves are especially suitable for handling abrasive materials like the dense media slurry and the slate and rock sinks which are passed through said control valves.

Figure 6:
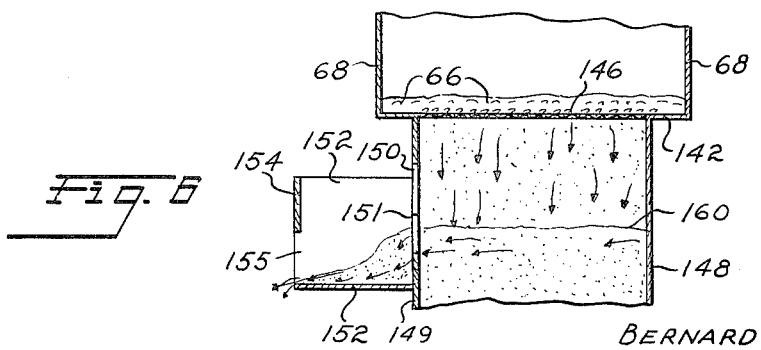
FIGURE 6 is a fragmentary sectional view of part of the dense media settling and recovery compartment, taken along line 6—6 in FIGURE 3.

Referring especially to FIGURES 3, 4 and 6, one wall 149 of settlement compartment rectangular section 148 is provided with an aperture 150, having an outline as shown in FIGURE 3, including a lower V-shaped weir section 151. A U-shaped trough 152 is secured, by welding or the like, to the exterior of wall 149 and extends laterally therefrom, with the upper portion of its forward end being connected by a cross plate 154 to provide an exit 155 at the end of the trough. The purpose of this weir arrangement 150–155 is amplified below.

Before proceeding to detailed description of the magnetic drum apparatus 30 for reclaiming magnetite from the coal floats and waste sinks, the mode of operation of the dense media separatory system 20 and dense media settlement and weir compartment 24 will now be described, with reference to FIGURES 1–6.

The main storage sump 118 is filled to the level indicated at 158 (when not in operation) with a dense media slurry comprising magnetite particles of 30 to 350 mesh size suspended in water in such proportion that the resultant slurry has a specific gravity between 1.40 to 1.75; 1.60 sp. gr. will be used for purposes of further description of operation. Motor 136 is turned on to operate the sump pump 120 which feeds the magnetite slurry through the pump discharge pipe 128 to the main slurry manifold 88 and the secondary slurry manifold 102. Slurry then falls to level 158'. Main manifold 88 is of larger size and therefore passes a larger quantity of slurry than the secondary manifold 102; e.g., in the ratio of 2:1. Slurry from the main manifold 88 passes through at least partially open control valve 86 into the annular circulating compartment 50 at the bottom of the main separatory vessel 44. A rotary motion is imparted to the slurry in the annular circulating compartment 50, and the slurry is discharged from that compartment into the main vessel 44 in the form of jets passing through the apertures 52 in the bottom cone compartment 48. Hence, the magnetite slurry is introduced into the main separatory vessel 44 with a circular and upward motion which helps maintain the particles of the slurry in even suspension throughout the vessel with the desired specific gravity. At the same time, coal, slate and rock raw feed material 38 is fed from the Parrish shaker 22 into the main separatory vessel 44 through the feed well 42. This raw feed material is deflected by the particle distributor 82, thus causing the feed material to distribute evenly through the intermediate separation zone B of vessel 44 and preventing the formation of solid masses which might otherwise occur, thereby facilitating effective dense media floats and sink separation. Distributor 82 also quiets upward flow of the dense media slurry and prevents boiling action.

Since the dense media slurry is constantly moving in a circular and upward current and the feed particles are being distributed through the intermediate zone B of the separatory vessel (FIGURE 5), most of the dense media causes the lighter particles of coal to be raised to the top of the vessel 44, whereas the particles of slate and rock and like non-combustible material which are heavier than the dense media settle with some of the magnetite through the bath in the vessel to the bottom slate and rock cone 48, and thence pass through the slate and rock discharge conduit 56 to the sinks siphon manifold 90.

With the siphon control booster valve 112 being at least partially open, the motor driven sump pump 120 causes slurry to be fed through the secondary manifold 102 into the sinks and discharge siphon 114. This creates an aspirator effect so that the slate and rock sinks from the main separatory vessel will immediately start to discharge through the siphon 114 and at least partially open siphon control discharge valve 117 into the spill box 119 of the sinks discharge chute 26. It will be noted that this new improved all-hydraulic siphon sink removal and booster arrangement does not rely only on static head in separatory vessel 44 to accomplish removal of the sinks, and provides a positive action to assure continuous effective operation of the siphon removal system without blockage. It will also be noted that the booster control valve 112 permits control of the rate of slurry feed from the sump thereby controlling the rate of siphon action in the sinks removal portion of the system.

At the same time that the heavier waste sinks (with some slurry) are being discharged from the main separatory vessel 44 through the siphon, the lighter coal particles are floated by the rising major portion of the slurry over the weir periphery 64 of separatory vessel 44 into the launder 58, as schematically shown in FIGURE 5. The control valve 86 in the main manifold 88 can be used to throttle the rate of flow and thus the force of the slurry jets through apertures 52 in the bottom cone 48 of vessel 44, and the rate of upward flow of the slurry in vessel 44. Valve 86 also can thus be used to control the head on the vessel weir 64, thus controlling the rate at which the raw material feed 38 is processed to separate the coal floats and sinks.

(It is noted at this point that the siphon booster arrangement including valve 112 and piping 110 and 113 can be part of a separate water system, in which case the secondary slurry manifold 102 is eliminated and water is fed into the siphon 114 instead of slurry to provide the aforementioned controlled booster and aspirator effect for the sinks discharge siphon manifold 90 and siphon 114. In that event, means would have to be provided for removal of excess water thus added, to lower the specific gravity of the magnetite slurry before return thereof to slurry sump 118.)

Referring especially to FIGURES 5 and 6, the coal and slurry floats 66 which are discharged into launder 58 flow down the sloping launder floor 62 and over the wire mesh screen 146 above the settlement and weir compartment 24. The magnetite slurry in this floats mixture has an increased water content due to the 15% to 20% moisture in the raw material feed 38, whereby its specific gravity has been reduced substantially below the desired 1.60 sp. gr. As this mixture passes over the screen 146, a large proportion of the diluted magnetite slurry is by-passed through the screen into the compartment 148, which forms a settlement tank in which this slurry will rise to a level 160 which is dependent on the location of weir 151 and the setting of the control valve 156. The magnetite particles of the diluted slurry will sink relatively rapidly, since there is no agitation, and the slurry near upper level 160 in compartment 148 will have a low specific gravity of about 1.2, while the slurry in the lower region 150 of the settlement compartment will have a relatively high specific gravity of as much as 1.9–2.0, with varying specific gravities at different vertical levels between these two points. Referring especially to FIGURE 6, the diluted low specific gravity slurry adjacent upper level 160 flows from settlement compartment 148 through the V-shaped weir 151 into the U-shaped trough 152. This removes from the slurry circulated through the dense media separatory system excess water due to the 15%–20% moisture in the raw material feed 38, thus maintaining the necessary specific gravity for the slurry in the system, which would otherwise fall below the requisite value of between 1.4 and 1.75, or more especially 1.60. The dilute water and slurry mixture discharged from compartment 148 through the weir 151 is conducted by gravity through suitable piping (not shown) from opening 155 of trough 152 to a suitable magnetic separatory device, such as the magnetic separator 30 disclosed in FIGURES 7–10, and hereinafter more fully described. By proper throttling of valve 156, the operator can control the height of the slurry over-flow level in the settlement compartment 148 and thus control the specific gravity of the slurry returned to the main sump 118 through the discharge conduit 158, and thereby maintain the desired specific gravity for the dense media separatory system 20.

As previously indicated, when magnetite slurry is used, the non-combustible slate and rock sinks discharged to chute 26 are transferred to a magnetic separatory device such as 30 in FIGURES 7–8 for further recovery of the magnetite therefrom in view of its cost. In any event, the mixture of coal floats plus the dense media slurry which has not by-passed through screen 146 into the settlement compartment 148 is passed to a device for removing the dense media; in this system utilizing magnetite, this floats mixture is transferred by chute 28 to my new improved magnetic separator 30, which will now be more fully described.

Referring to FIGURES 7–10, and more especially 7 and 8, the new improved magnetic separatory system, generally indicated at 30 comprises a main chute 28 that is mounted on suitable supports (not shown) and includes a base 170 and upright sides 172 and 174, made of steel or other suitable material of suitable size, with the chute being set at a pitch of one and one-half inch per foot.

The upper end of the chute 28 is provided with an angle iron flange 176 welded or otherwise suitably secured to chute base and sides 170, 172 and 174. The chute-like section formed by sides 68 and screened rectangular plate 142 extending from the open end of separatory vessel launder 58 is likewise provided with an angle iron flange 178 suitably secured thereto by welding or the like. The upper end of chute 28 is joined to the output chute of the separatory vessel launder 58 by means of a plurality of bolts 180 extending through flanges 176 and 178, whereby the floats 66, comprising coal particles and slurry not by-passed into compartment 148, pass to section 182 of chute 28.

The chute 28 is provided below magnetic separator drum 190 with a semi-circular section of steel plate 194 that extends transversely of the chute and has one end supported by sloping plate 196 and its other end supported by angle shaped member 198, both members 196 and 198 being suitably secured to chute sides 172 and 174. The bottom 170 of the chute 28 is provided with a commercially available stone patch lining 200, to prevent wear of the metal chute base 170 due to the abrasive action of the material processed. To process floats and sinks at the same time, the magnetic separator chute 28 is partitioned by means of a series of plates 184, 186 and 192. Diagonally disposed plate 184 is suitably secured at one end to the chute side wall 172 and at its other end to the partition plate 186 which is substantially semi-circular and extends longitudinally below the magnetic separator drum generally indicated at 190. The other end of the substantially semi-circular partition plate 186 is suitably connected to longitudinally extending partition plate 192, whose end 193 is suitably secured to the transverse end wall 195 of chute 28. The substantially semi-circular plate 186 is shaped as shown in FIGURE 7, and its ends are substantially perpendicular to chute bottom 170 so that this plate can be readily connected to the adjoining ends of partition sections 184 and 192. The clearance between the inner circular periphery of plate 186 and drum 190 is small enough, about $\frac{1}{64}''$, to prevent particles of waste or coal from passing between channels 31 and 182.

A steel shroud comprising plates 202 and 204 is suitably secured transversely between side walls 172 and 174 of the chute 28 on the input side of the magnetic drum 190. The substantially vertical side 204 of the shroud does not extend to the base of the chute, and the end of shroud plate 202 is also spaced from the bottom of the chute and from the periphery of the drum 190, thus providing openings 206 and 208 through which the material to be processed may pass. This shroud 202, 204 and the incline 196 govern the height of, and slow the flow of, material passing down chute 28 prior to passing between the circular chute portion 194 and the magnetic drum 190. When the separatory chute 28 has partitions dividing it into dual channels 31 and 182, for simultaneously reclaiming magnetite from both the floats and sinks, the shroud part 202 terminates short of substantially semi-circular partitioning section 186, and the partition section 186 is slotted to accommodate substantially vertical shroud section 204, and has its lower end cut to closely fit within shroud 204, 208. The means for partitioning chute 28 to simultaneously handle both floats and sinks can be adjusted with respect to the chute center line (with a given vertical position for magnetic drum 190) to thus vary the cross sectional area of passages 31 and 182 below the drum 190 for the floats and sinks, respectively, according to the ratio of coal and waste in the raw material feed 38. To do this, partition sections 186 and 192 are moved to the desired position parallel to the chute centerline, and a shorter or longer slanted plate 184 is substituted as needed. The chute arrangement can be supplied with several plates 184 of various suitable sizes, and chute walls 172 and 195 can be provided with a suitable series of bolt-filled apertures for securing the partition 184, 186 and 192 in the desired location.

The magnetic drum unit 190 is vertically adjustable with respect to the chute 28 for more efficient handling of varying volumes of floats and/or sinks, and the means for adjustably mounting drum unit 190 will now be more fully described. However, the magnetic drum unit 190 is per se conventional and not a part of the present invention, and therefore will not be described in great detail.

Referring especially to FIGURES 9 and 10, a transversely extending beam 210 is secured below the chute 28 by suitable means, such as angles 212 and 214 and welds or bolts. Each end of beam 210 is secured to the bottom of an elongated I-beam 216 and 218, and I-beams 216 and 218 are supported by suitable frame means (not shown). A suitable take-up means indicated generally at 220 (such as Link Belt style GS-3100 take-up) is mounted on each of I-beams 216 and 218 by a plurality of bolts 219 passing through a filler 221. Each take-up 220 includes a bushing 222 which nonrotatably receives the shaft 224 of the magnetic drum unit 190, since the shaft 224 does not revolve during operation of magnetic drum unit. Referring especially to FIGURE 10, the magnetic recovery drum unit 190 includes a pair of end drum heads 226 and 228 for a cylindrical non-magnetic drum shell 230, and the exterior of the drum is encompassed by a cylindrical stainless steel drum cover 232. This drum is rotatably mounted on the non-rotating shaft 224 by means of self-aligning ball bearings 234. A magnet arrangement 236 including a plurality of transversely extending high-power magnet elements 237 is non-rotatably mounted on the magnetic separatory drum shaft 224 by suitable mounting posts 238 and keys and set screws 240 and 242. As schematically illustrated in FIGURE 7, the magnet arrangement 236 typically includes five magnets 237 at circumferentially spaced intervals along the lower part of the drum 190 adjacent shell 230 to provide a series of alternating polarity magnetic fields. Referring again to FIGURES 9 and 10, a cylindrical hub 244 carrying a drive sprocket wheel 246 is secured to drumhead 228 by a plurality of bolts 248, providing means for rotating the drum unit 190 with respect to the chute 28, by a conventional motor (not shown) which would be about 1½ horsepower for a 60 ton per hour operation. As will be apparent, the vertical position of magnetic drum shaft 224 may be adjusted with respect to the chute 28 by operation of the adjusting wheel 221 of take-up means 220, thus changing the cross-sectional area of the passage between the magnetic drum unit 190 and the semi-circular chute section 194, and also thereby adjusting the mean distance between the magnets 237 and the particles of magnetite to be separated from the floats and sinks passing down chute 28.

Referring again especially to FIGURES 7 and 8, the drum unit 190 is rotated clockwise in FIGURE 7. As the floats and sinks pass down the chute 28 and over the curved section 194 below drum unit 190, the magnets 237 attract the magnetite particles from the slurry mixture in the floats and sinks being processed, and cause these particles to cling to the drum cover 232 and thus be carried upward away from the mixture of non-ferrous material in the chute (namely, coal floats, and waste sinks, plus water). These magnetite particles clinging to the non-magnetic drum surface 232 are raised a suitable distance above the level of the non-ferrous material being discharged from the magnetic separatory apparatus 30; and a magnetite recovery arrangement, generally indicated by the numeral 250 is provided to retrieve this magnetite. (It is noted at this point that because the section of FIGURE 7 is taken along line 7—7 in FIGURE 8, the input to the separatory drum system 30 in FIGURE 7 is a mixture of the coal floats and slurry as shown at 66, whereas the material being processed below the drum unit 190 is a mixture of waste sinks and slurry as indicated by the numeral 67, and the chute output 66' is coal and water on the floats side 182 of the chute 28.)

Since the magnetite retrieval apparatus 250 is known to the art and is not per se a part of the present invention, it is shown and described only in sufficient detail to explain the overall operation of the magnetic dense media separatory and magnetite reclaiming system of the present invention. The retrieval apparatus 250 includes a scraper 252 which extends across the face width of the stainless steel drum surface 232 between a pair of end walls 256. Just below the edge of scraper 252 adjacent the drum surface 232, there is disposed a sloping plate 254, which extends between end walls 256. The slurry retrieval apparatus 250 also has a transversely extending end wall 258, and a bottom section that has an aperture to which there is connected a pipe 260 that extends through the bottom 170 of the chute 28; hence, the material being processed (floats and/or sinks) can pass down chute 28 around the pipe.

As the drum 190 rotates the magnetite particles clinging to the drum surface due to the magnetic field, indicated at 262, are raised to a point above the upper-most magnet 237 and upper edge of sloping wall 254, whereupon these particles start to drop off onto the sloping wall 254, as indicated at 263, due to loss of the magnetic field, since the stainless steel drum surface 232 is non-magnetic. The particles of magnetite which continue to adhere to the drum (e.g., due to moisture) are scraped from the drum surface 232 by the edge of scraper 252 and also fall onto sloping plate 254. Usually the magnetite retrieval arrangement 250 is provided with a water spray shown schematically at 264 and the magnetite 263 thus removed from the drum surface 232 gravitates in the form of a slurry to the removal pipe 260. A magnetite slurry of approximately 2.0 sp. gr. is discharged from pipe 260, and is returned to the main media separatory sump 118 by suitable piping (not shown), in a manner that will be apparent to those skilled in the art in the light of this disclosure.

The non-ferrous material which has passed beneath drum unit 190 (more especially, coal particles in part 182 of chute 28 and waste in part 31 of chute 28), is thereafter discharged from the separatory chute 28 through end discharge openings 266 and 267, respectively. Referring especially to FIGURE 7, particles of coal of $3/32$ of an inch to 30 mesh size plus water pass through the chute's coal discharge opening 266 to a de-watering screen of conventional type, generally indicated at 268, wherein the feed spray and slurry water is eliminated from the desired coal product. This water can be used, if desired, for make-up water in the main media sump 118.

In prior type magnetic drum and chute separator systems, the magnetic drum is disposed over a section of the chute (corresponding to 28 herein) which has a V-shaped vertical cross section, with the bottom of the V having an outlet in communication with the discharge conduit for the non-ferrous material being processed, e.g., coal or sinks (instead of a semi-circular section 194 below the drum with the processed non-ferrous material being discharged to an extension of the input chute on the other side of the magnetic drum). Such prior type of magnetic media recovery system has a number of shortcomings, including, among others, the following: The magnets of the drum cannot be used with optimum efficiency because they are disposed along a circular arc, whereas the material to be processed moves along a straight surface, so that the various magnetic elements are unevenly spaced from the magnetite in the slurry and are too far from some of them. Also, the outlet for processed non-ferrous material is necessarily of limited size because of the V-section, whereby such a magnetic drum separator system cannot efficiently handle a high volume of material. Furthermore, because of the use of a chute portion of V-shaped vertical cross-section below the magnetic drum, the magnetic drum position with respect to the chute is not practically adjustable to change the cross-sectional processing area for efficient handling of varying volumes of material. For example, if the system is designed to handle 200 gallons per minute based on a velocity of 100 feet per minute down the chute, the system can handle only this volume, and is not adjustable to handle some larger volume like 600 gallons per minute.

However, my new improved magnetic drum type recovery apparatus 30, which includes a chute 28 having a semi-circular cross-section 194 vertically disposed below the magnetic drum, can process larger quantities of material with more efficient usage of the magnetic field of the magnets 237 since they are disposed along a circle substantially concentric with chute section 194. It will also be apparent that my new improved magnetic drum and chute system 30 with adjustable mounting of shaft 224 of the magnetic drum 190 so that it can be vertically positioned with respect to circular section 194 also makes it possible to adjust the cross-sectional area of the passage between the drum 190 and the chute 28 to thereby more efficiently process different volumes of material at a given velocity, and to especially efficiently process low volumes of material.

Of course, although the magnetite recovery and chute apparatus of the present invention is shown and described as including a partitioned chute arrangement for simultaneous recovery of magnetite media from both the coal floats and waste sinks, the partition arrangement can be omitted where it is not necessary or desirable, as where the recovery of magnetite from the waste sinks is not economically worthwhile in a particular installation.

In a typical commercial construction of my new improved magnetic separator system 30, the take-up means 220 for adjusting the vertical position of the drum shaft 224 would be arranged so that the drum 190 could readily be set at one of three different heights ($x$ in FIGURE 7), for example, one inch, two inches, and three inches. This provides a base, double and triple rates of material processing for a given linear rate of flow of material. In that event, three semi-circular partition sections 186 would be provided, each of such configuration that when suitably mounted on the semi-circular section 194 of the chute 28, there would be approximately $1/64''$ clearance between its upper circular periphery and the outer cover 232 of the magnetic drum 190.

It is believed that the operation of the new improved magnetic separatory system 30 of the present invention is sufficiently clear from the foregoing description of this portion of my invention, that a summary description of operation is unnecessary.

It will be apparent from the foregoing that the present invention disclosed in FIGURES 1-10 provides new improved dense media recovery apparatuses and methods, which are especially suitable for use with magnetite dense media, to efficiently separate various sizes of fine coal from undesired non-combustibles in mine waste raw material; and that these inventions achieve the valuable objects and advantages, and overcome the serious shortcomings of prior dense media separatory systems, as set forth earlier in this application.

Referring to FIGURES 11-14, detailed description will now be made of the modified form of separatory vessel and circuit for carrying out a new improved froth flotation process of separating very fine mineral particles of minus 20 mesh to 60 mesh from useless gangue, e.g., No. 6 coal from non-combustible refuse in mine waste raw feed (without dense media, which cannot efficiently be used for separation of such fine particles).

Most components of the separatory apparatus used for my new improved froth flotation separatory process are the same as, or only slightly modified from, corresponding components of the dense media separatory system 20 of FIGURES 1-6. Accordingly, to permit abbreviation of the description of the modified froth flotation apparatus and improved method of FIGURES 11-14, the components of the apparatus in FIGURES 11-14 corresponding to those of the dense media apparatus of FIGURES 1-6 are identified with like numerals as in FIGURES 1-6, but with the subscript $a$. Components thus numbered need not and will not be described again in detail, and the following description of the new improved froth flotation system of FIGURES 11-14 is principally directed to features thereof which differ from the dense media system of FIGURES 1-6.

Referring especially to FIGURE 11, the new improved froth flotation system for separating fine coal particles of minus 20 mesh to 60 mesh from non-combustible particles of like size comprises: the froth flotation separatory vessel and hydraulic circuit generally indicated at 20$a$, to which raw material is fed by feed means 22$a$; an air input means 262; wet reagent feeder means 260 for feeding suitable amounts of appropriate agents, such as fuel oil and pine oil, to form a flotation froth, as hereinafter amplified; a discharge chute 26$a$ for the heavier gangue tailings from the separatory system 20$a$; a discharge chute 28$a$ for the froth floats concentrate "pulp" which includes the desired fine coal particles separated from the gangue by system 20$a$; a conventional type partitioned vibrator 261 for de-watering the coal concentrate "pulp" and tailings.

As will be apparent from a comparison of FIGURE 11 with FIGURE 1, FIGURE 12 with FIGURE 2, FIGURE 13 with FIGURE 4, and FIGURE 14 with FIG-5, the froth flotation separatory apparatus 20$a$ is substantially like that of the dense media separatory apparatus 20 of FIGURES 1-6, excepting for the following:

(a) The forth flotation system 20$a$ of FIGURES 11-14 does not include the dense media settlement compartment and associated circuitry generally indicated at 24 in the dense media system 20 of FIGURES 1-6 (comprising settlement and weir tank 148, wire mesh by-pass screen 146, weir level control valve 156, and sump return conduit 158, etc.). In view of this, a solid plate 62$b$ is provided in the FIGURES 11-14 froth flotation system as the extension of launder base plate 62$a$, in lieu of screened plate 142, 146 used in the dense media system of FIGURES 1-6. (Cf. FIGURES 11 and 1; 14 and 5; 13 and 4.)

(b) The annular circulation compartment 50a in the froth flotation system of FIGURES 11–14 is provided with a fitting 262 for an air inlet hose 264 which is connected to a suitable air compressor (not shown). If desired, the separatory vessel for the dense media system of FIGURES 1–6 can be made with such a fitting and a suitable plug means, to permit ready convertibility of the basic separatory apparatus (20a) from dense media to froth flotation process, and vice versa.

(c) The froth flotation recovery system 20a, which does not utilize any dense media, includes the reagent feeder means 260 for storing No. 2 fuel oil and pine oil, respectively, and feeding each of these reagents at the desired rate into the separatory vessel 44a at an appropriate level by means of conduits 266 and 268, which may have valves for controlling the rate of reagent feed to the separatory vessel. The reagent feeder means 260 and conduits 266 and 268 may be made up of any suitable commercially available devices, in various arrangements which will be apparent to those skilled in the art in the light of the disclosure herein; and since the particular construction of the wet reagents feeder means is not part of the present invention, this means 260 is shown somewhat schematically and is not described in detail.

(d) The conventional vibrator 261 of the FIGURES 11–14 froth flotation system is merely a dewatering device (and not a magnetic dense media reclaiming device like the magnetic recovery apparatus 30 of the dense media system of FIGURES 1–6). Only de-watering of the coal concentrate "pulp" from system 20a is required because the reagents used for the froth flotation process are not deleterious to the desired coal product, but in fact improve the product, as amplified below.

In operation, the main storage sump 118a is filled with water to a level indicated at 158a when not in operation. Motor 136a is turned on to operate the pump 120a in the bottom of sump 118a, and the pump feeds water through the pump discharge pipe 128a to the main manifold 88a and secondary booster manifold 102a.[1] Manifold 88a is of larger size and passes a larger quantity of water than secondary manifold 102a; for example, in a ratio of 2:1. Water from the main manifold 88a passes through at least partially open control valve 86a into the annular circulating compartment 50a at the bottom of the main separatory vessel 44a, in which compartment a rotary motion is imparted to the water. At the same time, air is injected into this compartment 50a through the air hose 264 and fitting 262, so that aerated water is discharged from compartment 50a into the lower conical section 48a of the main vessel 44a, with a circular and upward current. At the same time, a mixture 38a of fine coal and non-combustible particles of minus 20 mesh to 60 mesh, and typically 25% to 30% ash, is fed from the output of Parrish type raw feed shaker 22a into the main separatory vessel 44a, through the feed well 42a, while minus 60 high ash material 37a is discharged to waste from side 32a of the Parrish shaker 22a. The raw feed material passing from the lower end of the feed well 42a is deflected by the particle distributor 82a, and the particles of the feed cascade outwardly therefrom and distribute evenly through the intermediate separation zone of vessel 44a. This prevents the formation of solid masses which might otherwise occur, and facilitates an efficient froth flotation floats and sinks separation process according to this invention.

The froth flotation separatory action in the main vessel 44a comprises three distinct forms: (1) agitation, (2) separation, and (3) concentration. Referring especially to FIGURE 14, the agitation takes place in the lower portion of the vessel 44a, especially in conical section 48a under the action of the aerated water jets coming through inlet openings 52a. The fuel oil and pine oil coat the air bubbles in the aerated water injected into the main vessel 44a, and the oil coating on the rising air bubbles causes particles of the lighter desired mineral falling through the vessel 44a between the bottom of the distributor 82a and the agitation zone to adhere to the air bubbles which are moving towards the top of the vessel 44a, and thus carry the adhered particles upward also. Agitation and swirling must cease or the air bubbles will be slowed and lose their load of fine coal particles; and this is accomplished by the distributor 82a which quiets upward flow and prevents boiling action in the middle separation region of the vessel 44a. The lighter mineral-laden oil-coated air bubbles separate from the heavier worthless gangue and pass upward around the outside of the distributor 82a without dropping their load to form a froth, while the heavier gangue particles or tailings continue to sink through the air bubbles and water to the conical section 48a of the vessel. This gangue passes through the tailings discharge opening 56a to the tailings manifold 90a.

As the mineral-laden bubbles move to the upper-most concentration zone of the vessel 44a, they form a kind of concentrated "pulp" made up of water including oil-coated bubbles of air which have a number of the desired fine coal particles clinging to them. This concentrated "pulp" is carried upward over the weir top 64a of the separatory vessel 44a into the launder 58a by the "crowding" action of succeeding oil and mineral-coated air bubbles and water moving up from below. This concentrated pulp 66a then passes down the inclined launder bottom 62a into the chute 28a, from which it is discharged into one section of the schematically shown conventional type partitioned vibrator 261.

Meanwhile, with the siphon control booster valve 112a being at least partially open, the motor-driven sump pump 120a causes water to be fed through the secondary manifold 102a into the sinks and discharge siphon 114a. This creates an aspirator effect so that the tailings being discharged from the main separatory vessel 44a through conduit 56a into the tailings manifold 90a will immediately start to discharge through the siphon 114a and the at least partially open siphon control discharge valve 117a into the spill box 119a of the tailings discharge chute 26a. These tailings are discharged by gravity down chute 26a to the other side of the partitioned vibrator 261.

In the vibrator 261, the concentrate "pulp" is dewatered and discharged as a product of oil-coated coal of minus 20 mesh to 60 mesh, with about 11% to 12% ash, which is suitable for domestic or commercial use. The tailings from chute 26a are also de-watered in vibrator 261 and disposed to waste, since they are minus 20 mesh to 60 mesh material with 65% to 75% ash; however, de-watering of the tailings can be omitted, if desired, in which case vibrator 261 is not a partitioned type. The underflow water from the vibrator 261 can be used for make-up water in which event, it is passed to the sump 118a by suitable piping not shown.

It will be apparent to those skilled in the art, from the drawings and the foregoing description, that the operation of the valves 86a, 112a, and 117a to control flow through the separatory vessel 44a and discharge siphon 114a and related hydraulic circuitry of system 20a, and to thus control the rate of operation, system 20a is substantially the same as for corresponding components of the dense media separatory system 20 of FIGURES 1–5, which has been described above, in detail; hence, further description thereof is believed unnecessary.

The fuel oil and pine oil reagents used in my above-described new improved froth flotation process remain in the desired coal product, and provide additional B.t.u.'s during combustion, which increase the value and selling price of the coal. The oil which coats the very fine particles of No. 6 coal also eliminates the substantial coal dust and substantial loss of shipment by open car which otherwise occurs with such fine coal.

---
[1] Water level then falls to level 158a'.

It is noted that, to aerate the water used in the froth flotation system, the fitting 262 for injecting air into the annular circulating vessel chamber 50a may be omitted, and a main separatory vessel such as used for a dense media separatory process can be used with a compressed air line extending into the vessel from the top with its end a substantial distance below the feed particle distributor (82).

In carrying out the froth flotation recovery of very fine coal particles, it is generally the practice in the industry to use an enlarged, usually square, tank with an agitator to produce froth for flotation purposes. My new improved apparatus and method for feeding water into a circular vessel with a circular and rising action for froth flotation separation provides better results, and eliminates the need of an agitator system, among other things.

By way of illustration, the following is an example of a froth flotation process according to my above-described invention, carried out in a three feet diameter separatory vessel 44a based on 30 tons of flotation feed solids per hour:

Product: Anthracite coal fines.
Feed: Minus 20 mesh x 60 mesh. 20–25% solids, 25–30% ash.
Concentrate: 40% solids, 11–12% ash.
Refuse: 65–70% ash.
Reagent cost: $0.06 per ton of recovered coal fines.

CONSUMPTION OF REAGENTS

*Pine oil*

Cc. per min.:      Pounds per ton of feed
78 _____ .153
         Gallons per hour—1.23

*#2 fuel oil*

Cc. per min.:      Pounds per ton of feed
200 _____ .350
         Gallons per hour—2.17

It will be apparent from the foregoing that the present invention also provides a new improved apparatus and method for froth flotation separation of fine coal particles of minus 20 mesh to 60 mesh which achieves the objects and advantages discussed previously in this application. It will also be apparent from the foregoing that the present invention provides new improved apparatuses that are readily convertible to dense media separatory methods and froth flotation separatory methods, as desired, whereby common equipment can be used for both processes, and whereby production, inventory and distribution problems are greatly minimized, making the apparatuses of my invention even more competitive.

It will also be apparent that while the discussion of the apparatuses and methods of the present invention is primarily directed to the recovery of fine coal from mine waste raw material including high ash content, the present inventions can likewise be applied to recovery of desired fine particles of minerals of any kind from ores including large quantities of waste or gangue.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for separating fine mineral particles from heavier mineral particles in a raw feed mixture thereof, comprising: a main separatory vessel; input means for feeding fluid into the lower portion of said separatory vessel with an upward circulating motion; means for feeding a mixture of raw feed material into the upper portion of the separatory vessel; means for causing said raw-feed mixture to distribute evenly into the vessel; means for catching lighter particles floated from said raw feed and fluid mixture in the separatory vessel; outlet means at the lower region of the separatory vessel for exit of heavier sink particles from said raw feed mixture processed in said vessel; siphon means for removing said sink particles from said discharge outlet to a disposal means; booster control means operably associated with such siphon removal means for passage of fluid therethrough to induce flow of the heavier sinks through the siphon removal means, supplementing the static head in the siphon due to the fluid and raw feed mixture in the separatory vessel, a sump for storing dense media slurry; pump means for circulating said dense media slurry from said sump, and conduit means connecting the outlet of said pump means with said input means, whereby dense media slurry is fed to the lower portion of said separatory vessel, said siphon booster control means also being connected with the output of said sump pump by second conduit means so that the pump can simultaneously feed dense media slurry to both the separatory vessel input means and the siphon booster control means.

2. A dense media separatory apparatus as defined in claim 1, further comprising: valve means interposed in the said first-mentioned dense media slurry feed conduit for controlling the rate of flow of slurry to said input means and through the separatory vessel.

3. A dense media separatory apparatus as defined in claim 2, wherein said siphon booster control means further comprise: valve means interposed in said second-mentioned conduit means for controlling the rate of flow of said dense media slurry through said siphon booster control for governing the rate of flow of sinks in said siphon means.

4. An apparatus for separating fine mineral particles from heavier mineral particles in a raw feed mixture thereof, comprising: a main separatory vessel; input means for feeding fluid into the lower portion of said separatory vessel with an upward circulating motion; means for feeding a mixture of raw feed material into the upper portion of the separatory vessel; means for causing said raw feed mixture to distribute evenly through the vessel; means for catching lighter particles floated from said raw feed and fluid mixture in the separatory vessel; outlet means at the lower region of the separatory vessel for exit of heavier sink particles from said raw feed mixture processed in said vessel; siphon means for removing said sink particles from said discharge outlet to a disposal means; booster control means operably associated with such siphon removal means for passage of fluids therethrough, to induce flow of the heavier sinks through the siphon removal means, supplementing the static head in the siphon due to the fluid and raw feed mixture in the separatory vessel, a sump for storing dense media slurry; pump means for circulating said dense media slurry from said sump; conduit means connecting the outlet of said pump means with said input means, whereby dense media slurry is fed to the lower portion of said separatory vessel; said third recited means being a launder surrounding the upper portion of said vessel, and said launder has a discharge opening with a chute-like extension whose floor is provided with an opening therein and further comprising: a screen extending across said opening of mesh size greater than that of the particles used in the dense media slurry and smaller than that of the particles of said fine mineral in the floats discharged into said launder from the main separatory vessel; a dense media settlement compartment surrounding said screen opening and extending substantially vertically below said opening, the upper portion of said settlement compartment having a weir opening therein; and conduit means connecting the lower portion of said settlement compartment with said dense media sump; whereby a portion of the dense media slurry in the floats discharged from the separatory vessel falls into such settlement compartment as the floats pass from said launder over said screen and excess liquid of said slurry in the settlement compartment is removed through said weir opening, so that slurry of a relatively high gravity may be returned to said sump through said last-mentioned conduit.

5. A dense media separatory apparatus as defined in claim 4, wherein a control valve is interposed in said last-mentioned conduit means, between the lower portion of said settlement compartment and said sump, for controlling the height of by-passed slurry mixture in the settlement compartment with respect to said weir opening, thereby controlling the specific gravity of the dense media returned to the sump from said settlement compartment.

6. An apparatus as defined in claim 4, further comprising: a discharge chute extending from said screened floor chute-like extension of the launder for transferring floats from said separatory vessel including dense media slurry not by-passed through said slurry settlement compartment; and means associated with said discharge chute for further separating dense media slurry particles from said floats.

7. An apparatus as defined in claim 4 for separating fine mineral particles from heavier mineral particles in a raw feed mixture thereof by means of a dense media process utilizing a slurry suspension of magnetic particles further comprising: a chute for transferring floats and magnetic dense media slurry in said floats which has not by-passed through said screen into said slurry settlement compartment; and magnetic means associated with said discharge chute for further reclaiming magnetic particles from the dense media slurry in the floats material passing along said chute.

8. A magnetic dense media separatory apparatus as defined in claim 9, wherein said means for reclaiming said magnetic particles of dense media from said slurry include means adapted for return of such magnetic particles to said slurry sump.

9. An apparatus as defined in claim 7, wherein said transfer chute associated with said magnetic particle reclaiming means is partitioned for simultaneously handling said floats transferred along said chute and sinks plus slurry transferred from said sinks disposal means, so that said magnetic means reclaims magnetic dense media particles from the mixture of floats and slurry in one portion of said partitioned chute while reclaiming magnetic particles from the mixture of sinks and slurry in the other portion of said partitioned chute.

10. An apparatus as defined in claim 7, wherein said transfer chute has a section of substantially semi-circular vertical cross-section, and said magnetic means for reclaiming magnetic dense media particles comprises a magnetic drum disposed above said chute portion of substantially semi-circular vertical cross-section; whereby material processed in the magnetic dense media recovery apparatus is passed along a flat section of said chute to and through the passage between said substantially semi-circular chute section and the adjacent lower portion of said magnetic drum and the magnetic dense media particles are reclaimed from said material in said passage with the remainder of said material being discharged from the other side of said passage between said semi-circular chute section and drum.

11. An apparatus as defined in claim 10, further comprising: means for mounting said magnetic drum so that it is vertically adjustable with respect to said portion of the chute which has a semi-circular vertical cross-section, whereby the size of the passage therebetween can be varied in accordance with various quantities of material being processed to reclaim magnetic dense media therefrom so that the magnetic field of the magnetic media reclaiming drum is more efficiently used.

12. An apparatus as defined in claim 10, wherein said transfer chute of said magnetic particle reclaiming means is partitioned before, under, and beyond said drum, with a slight clearance therebetween, for simultaneously handling said floats transferred thereto and sinks plus slurry transferred from said sinks disposal means, so that said magnetic drum reclaims magnetic dense media particles from the mixture of floats and slurry in one portion of said partitioned chute, while reclaiming magnetic particles from the mixture of sinks and slurry in the other portion of said partitioned chute.

13. An apparatus for separating fine mineral particles from heavier mineral particles in a raw feed mixture thereof, comprising: a main separatory vessel; input means for feeding fluid into the lower portion of said separatory vessel with an upward circulating motion; means for feeding a mixture of raw feed material into the upper portion of the separatory vessel; means for causing said raw feed mixture to distribute evenly through the vessel; means for catching lighter particles floated from said raw feed and fluid mixture in the separatory vessel; outlet means at the lower region of the separatory vessel for exit of heavier sink particles from said raw feed mixture processed in said vessel; siphon means for removing said sink particles from said discharge outlet to a disposal means; booster control means operably associated with said siphon removal means for passage of fluid therethrough to induce flow of the heavier sinks through the siphon removal means, supplementing the static head in the siphon due to the fluid and raw feed mixture in the separatory vessel, said second- and third-recited means comprising: a feed well extending into said main separatory vessel from above the upper end thereof substantially along the central axis thereof; and a conical distributor spaced from the lower end of said feed well, with the conical point disposed upward, said distributor being secured to said feed well by a plurality of spaced members at a level intermediate the upper and lower regions of said main separatory vessel, said feed well and distributor sub-assembly being non-rotatably mounted on said main separatory vessel; whereby said raw feed mixture fed into the separatory vessel through said feed well cascades off said conical distributor and is thus distributed through the intermediate region of the separatory vessel.

14. An apparatus for separating fine mineral particles from heavier mineral particles in a raw feed mixture thereof, comprising: a main separatory vessel; input means for feeding fluid into the lower portion of said separatory vessel with an upward circulating motion; means for feeding a mixture of raw feed material into the upper portion of the separatory vessel; means for causing said raw feed mixture to distribute evenly through the vessel; means for catching lighter particles floated from said raw feed and fluid mixture in the separatory vessel; outlet means at the lower region of the separatory vessel for exit of heavier sink particles from said raw feed mixture processed in said vessel; siphon means for removing said sink particles from said discharge outlet to a disposal means; booster control means operably associated with said siphon removal means for passage of fluid therethrough to induce flow of the heavier sinks through the siphon removal means, supplementing the static head in the siphon due to the fluid and raw feed mixture in the separatory vessel, means for introducing compressed air into the lower portion of said separatory vessel and thereby aerating fluid fed by said input means into said lower vessel portion with upward circulating motion, means for feeding at least one froth forming agent into said aerated fluid to thereby form a froth which causes the lighter finer mineral particles to be floated to the top of the separatory vessel and removed therefrom while the heavier mineral sink particles fall to said discharge outlet, a sump for storing fluid; pump means for circulating said fluid from said sump, and conduit means connecting the outlet of said pump means with said vessel input means, said siphon booster control means being also connected with the output of said sump pump by second conduit means so that the pump can simultaneously feed fluid to both the separatory vessel input means and the siphon booster control means.

15. A froth flotation separatory apparatus as defined in claim 14 further comprising: valve means interposed in said first-mentioned conduit means for controlling the rate of flow of fluid to said input means and through the separatory vessel.

16. A froth flotation separatory apparatus as defined in claim 15 wherein said siphon booster control means further comprises valve means interposed in said second-mentioned conduit means for controlling the rate of flow of fluid from said sump through said siphon booster control for governing the rate of flow of sinks in said siphon means.

17. An apparatus for separating fine mineral particles from heavier mineral particles in a raw feed mixture thereof, comprising: a separatory vessel, including a main cylindrical section, with a bottom cone section having a plurality of circumferentially spaced apertures therein; an annular chamber surrounding the exterior of said apertured bottom cone section; means for feeding fluid into said annular chamber whereby it enters the lower portion of said separatory vessel through said apertures with an upward circulating motion; feed well means extending from the upper portion of said vessel for feeding a mixture of raw feed material into the separatory vessel, and distributor means below said feed well means for causing said raw feed mixture to distribute evenly through the vessel; launder means surrounding the upper weir periphery of said cylindrical section of the separatory vessel for catching lighter particles floated from said raw feed and fluid mixture in the separatory vessel; outlet means at the bottom of the separatory vessel cone for exit of heavier sink particles from said mixture processed in said vessel; a siphon manifold and siphon in communication with said outlet means for removing said sink particles from said outlet to a disposal means; and siphon booster control means including conduit means associated with said siphon manifold and siphon for inducing flow of the heavier sinks through the siphon manifold and siphon thus supplementing the static head in the siphon due to the fluid and raw feed mixture in the separatory vessel, said means for feeding fluid to said annular chamber comprising: a sump for storing dense media slurry; pump means for circulating said dense media slurry from said sump; a first slurry manifold connecting the outlet of said pump means with a control valve that has its outlet in turn connected with the input to said annular fluid chamber, whereby dense media slurry can be fed into the lower portion of said separatory vessel with circular rising motion at a controlled rate, said siphon booster control means being also connected with the output of said sump pump by a second slurry manifold so that the pump can simultaneously feed dense media slurry to both the separatory vessel input means and the siphon booster control means, and wherein said siphon booster control means further comprise valve means in said second slurry manifold for controlling the rate of flow of said dense media through said siphon booster control for governing the rate of discharge of said siphon means.

18. A dense media separatory apparatus as defined in claim 17, wherein said launder means has a discharge opening with a chute-like extension whose floor is provided with an opening therein and further comprising: a screen extending across said opening of mesh size greater than that of the particles used in the dense media slurry and smaller than that of the particles of said fine mineral in the floats discharged into said launder from the main separatory vessel; a dense media settlement compartment surrounding said screened opening and extending substantially vertically below said opening; the upper portion of said settlement compartment having a weir opening therein; and conduit means connecting the lower portion of said settlement compartment with said dense media sump; said last-mentioned conduit means including a control valve between the lower portion of said settlement compartment and said sump for controlling the height of by-passed slurry mixture in the settlement compartment with respect to said weir opening; whereby a portion of the dense media slurry in the floats discharged from the separatory vessel falls into said settlement compartment as the floats pass over said screen, and excess liquid of said slurry in the settlement compartment is removed through said weir opening, so that slurry of a relatively high gravity may be returned to said sump through said last-mentioned conduit, with said last-mentioned valve means enabling control of the specific gravity of the dense media returned to the sump from said settlement compartment.

19. An apparatus as defined in claim 18 for separating fine mineral particles from heavier mineral particles in a raw feed mixture thereof by means of a dense media process utilizing a slurry suspension of fine magnetic particles, further comprising: a chute for transferring floats and magnetic slurry in said floats which has not by-passed through said screen into said settlement compartment directly to a magnetic particle reclaiming apparatus which comprises rotatable magnetic drum means associated with said chute for removing magnetic particles from the dense media slurry in the floats material passing along said chute beneath said magnetic drum means.

20. An apparatus for separating fine mineral particles from heavier mineral particles in a raw feed mixture thereof by a froth flotation process, comprising: a separatory vessel, including a main cylindrical section, with a bottom cone section having a plurality of circumferentially spaced apertures therein; an annular chamber surrounding the exterior of said apertured bottom cone section; input means for feeding fluid into said annular chamber, whereby it enters the lower portion of said separatory vessel through said apertures with an upward circulating motion; feed well means extending from the upper portion of said vessel for feeding a mixture of raw feed material into the separatory vessel, and distributor means below said feed well means for causing said raw feed mixture to distribute evenly through the vessel; means for introducing compressed air into the lower portion of said separatory vessel and thereby aerating fluid fed by said input means into said lower vessel portion with upward circulating motion; launder means surrounding the upper weir periphery of said cylindrical section of the separatory vessel for catching lighter particles floated from said raw feed and fluid mixture in the separatory vessel; outlet means at the bottom of the separatory vessel cone for exit of heavier sink particles from said mixture processed in said vessel; a siphon manifold and siphon in communication with said outlet means for removing said sink particles from said outlet to a disposal means; siphon booster control means including conduit means associated with said siphon manifold and siphon for inducing flow of the heavier sinks through the siphon manifold and siphon thus supplementing the static head in the siphon due to the fluid and raw feed mixture in the separatory vessel, said means for introducing compressed air to aerate the fluid fed into the separatory vessel comprising an inlet fitting in the wall of said annular chamber, means for supplying compressed air through said fitting, means for feeding at least one froth forming agent into said aerated fluid to thereby form a froth which causes the lighter finer mineral particles to be floated to the top of the separatory vessel and removed therefrom into said launder while the heavier mineral sink particles fall to said discharge outlet, said means for feeding fluid to said annular chamber comprising a sump for storing fluid, pump means for circulating said fluid, a first fluid manifold connecting the outlet of said pump means with a control valve that has its outlet in turn connected with the input to said annular fluid chamber, whereby fluid is aerated and fed into the lower portion of said separatory vessel with circular rising motion at a controlled rate; and wherein said siphon booster control means is also connected with the output of said sump pump by a second fluid manifold so that the pump can simultaneously feed fluid to both the separatory vessel input means and the siphon booster control means, and wherein said siphon booster control means further comprise valve means in said second fluid manifold for controlling the rate of flow of said fluid through said siphon booster control for governing the rate of discharge of said siphon means.

References Cited by the Examiner

UNITED STATES PATENTS

| | | | |
|---|---|---|---|
| 1,048,824 | 12/1912 | Griffiths | 209—219 |
| 1,312,754 | 8/1919 | Rowand | 209—170 |
| 1,314,316 | 8/1919 | Flinn | 209—170 |
| 1,410,781 | 3/1922 | Towne | 209—170 |
| 1,545,636 | 7/1925 | Chance | 209—172.5 |
| 1,700,659 | 1/1929 | Van Bergen | 222—204 |
| 2,230,344 | 2/1941 | Bair | 209—219 |
| 2,690,261 | 9/1954 | Maust | 209—172.5 |
| 2,692,048 | 10/1954 | Davis | 209—172.5 |
| 2,692,049 | 10/1954 | Davis | 209—172.5 |
| 2,823,801 | 2/1958 | Strohl | 209—211 |
| 2,844,252 | 7/1958 | Furness | 209—223 |
| 2,877,896 | 3/1959 | Jones | 209—172.5 |
| 2,877,897 | 3/1959 | Davis | 209—172.5 |
| 2,932,395 | 4/1960 | Marot | 209—172.5 |
| 2,945,590 | 7/1960 | Stearns | 209—223 |
| 3,034,649 | 5/1962 | Connelly | 209—491 |
| 3,035,697 | 5/1962 | Koch | 209—161 |

FOREIGN PATENTS 23,333      1903      Great Britain.

HARRY B. THORNTON, *Primary Examiner.*

FRANK W. LUTTER, RICHARD A. O'LEARY,
*Examiners.*